Feb. 25, 1964　　　O. KILE ETAL　　　3,122,041
MAGAZINE TRIMMING DEVICE
Filed May 19, 1960　　　17 Sheets-Sheet 2
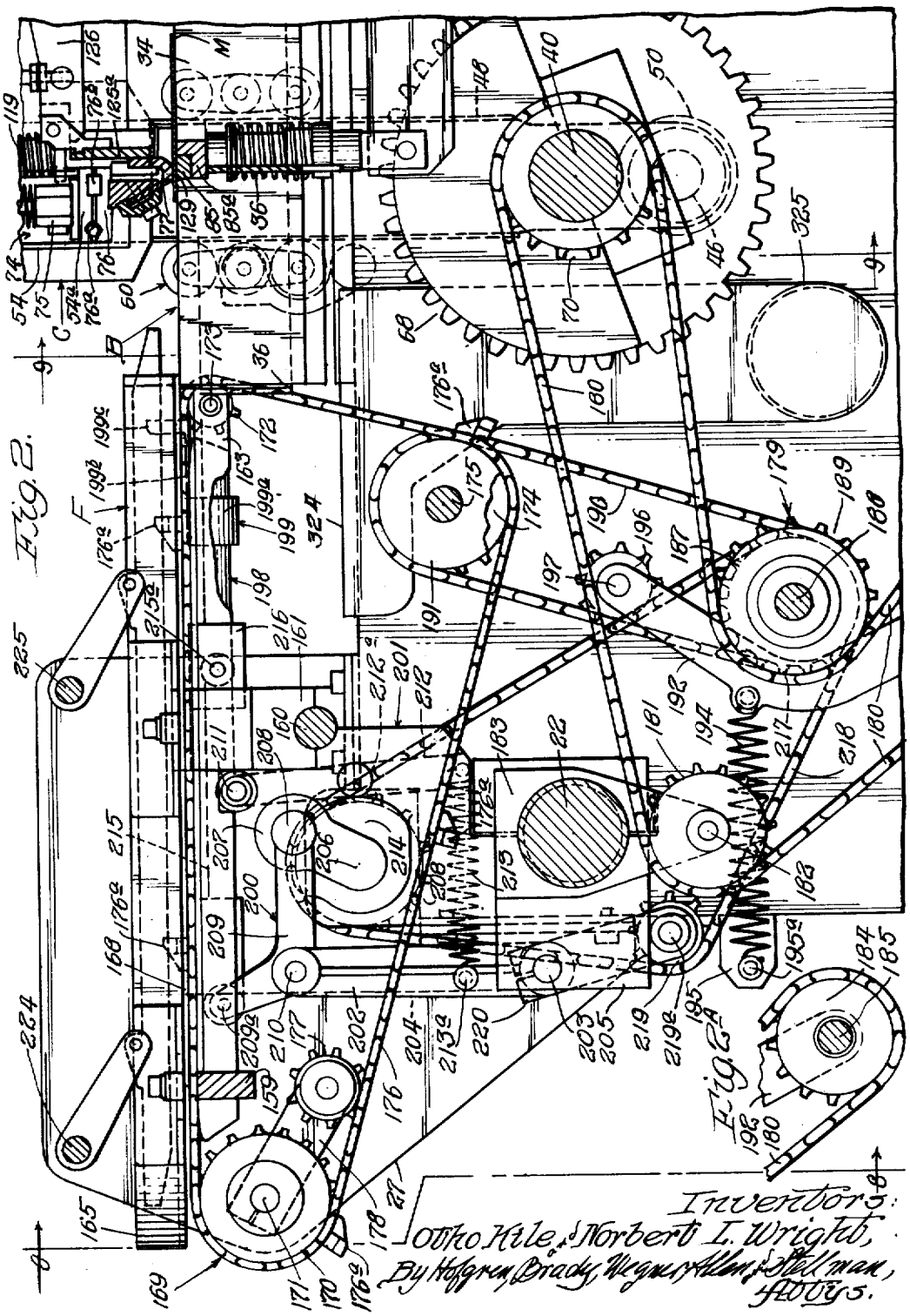

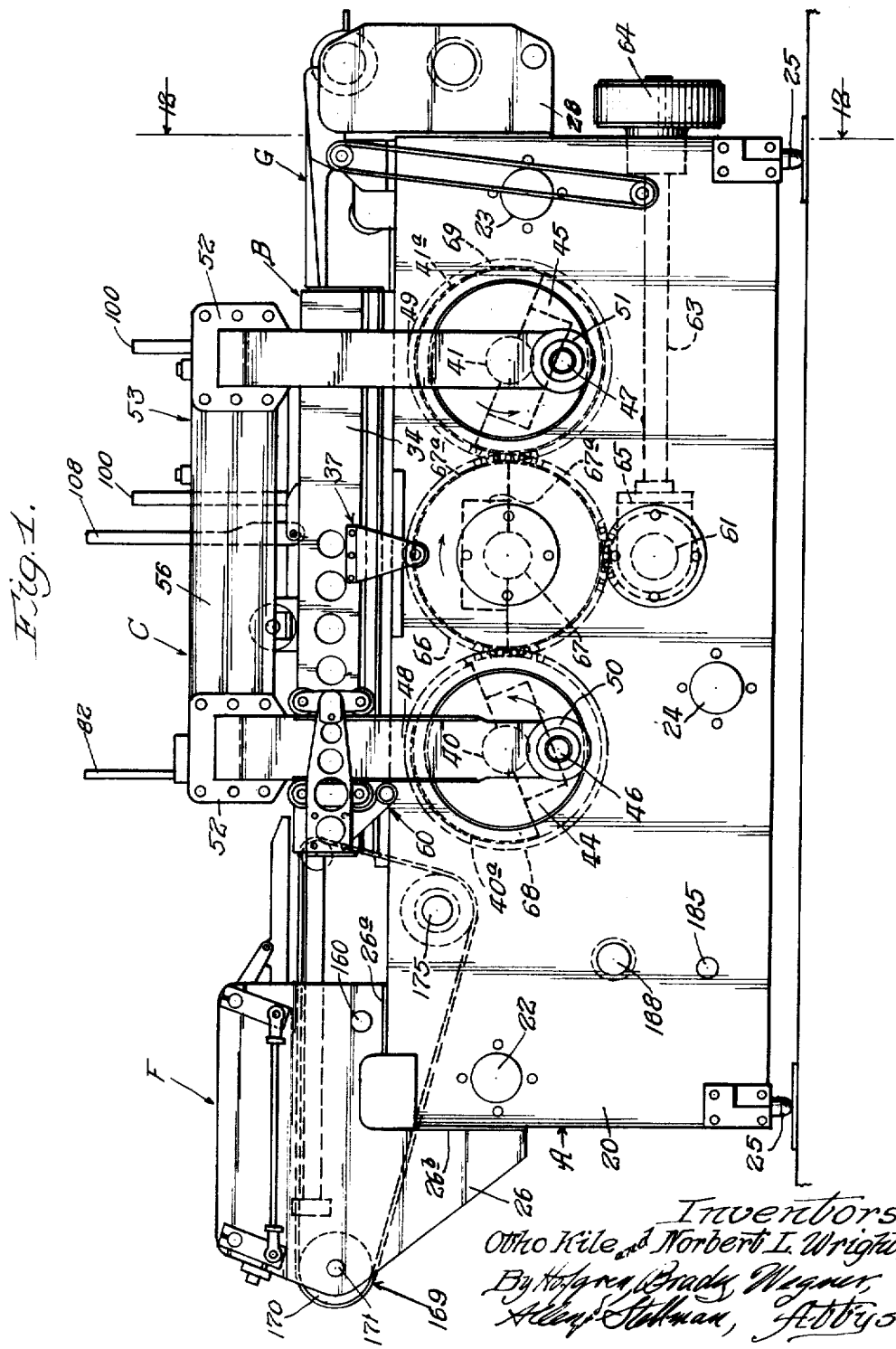

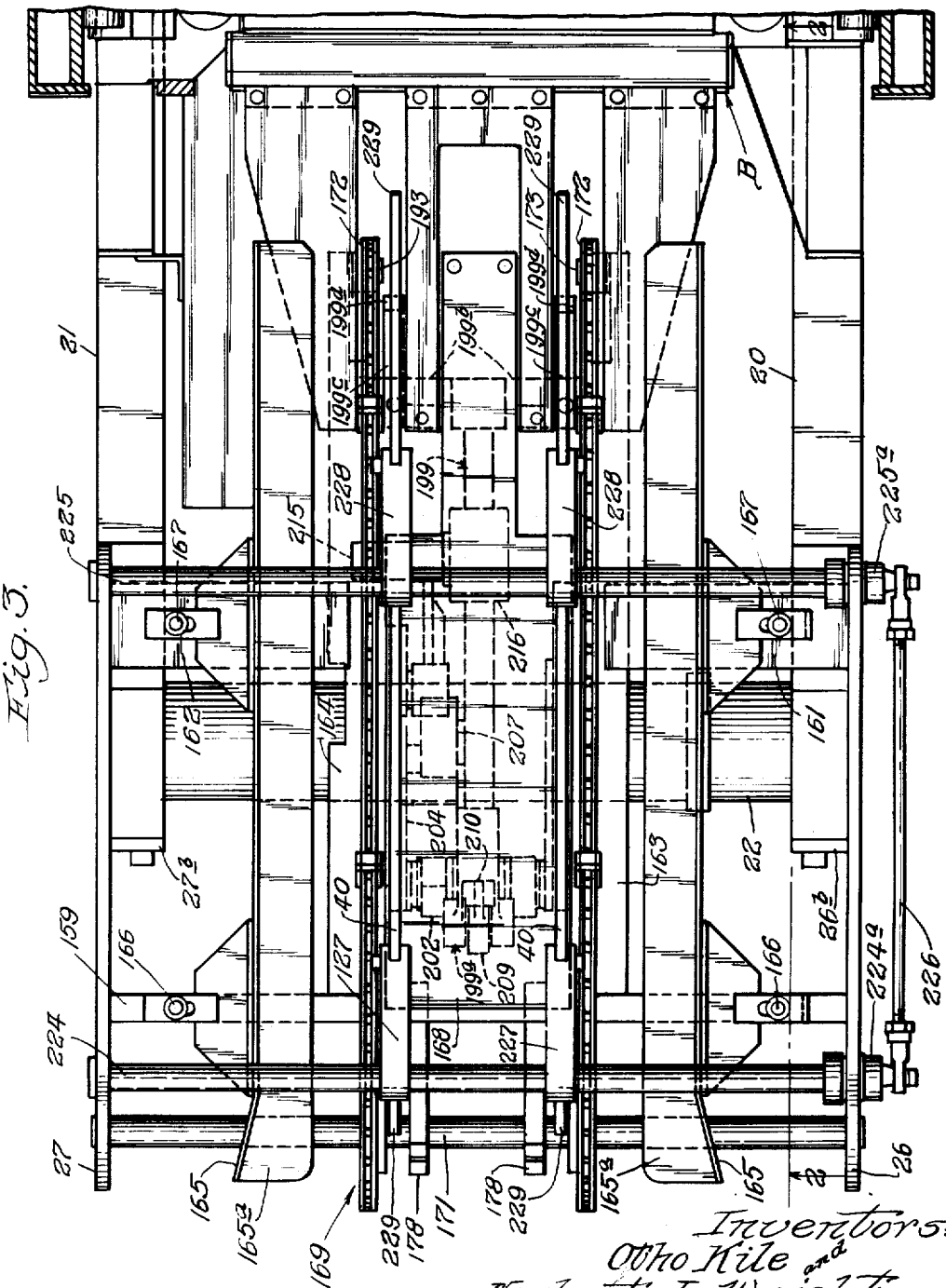

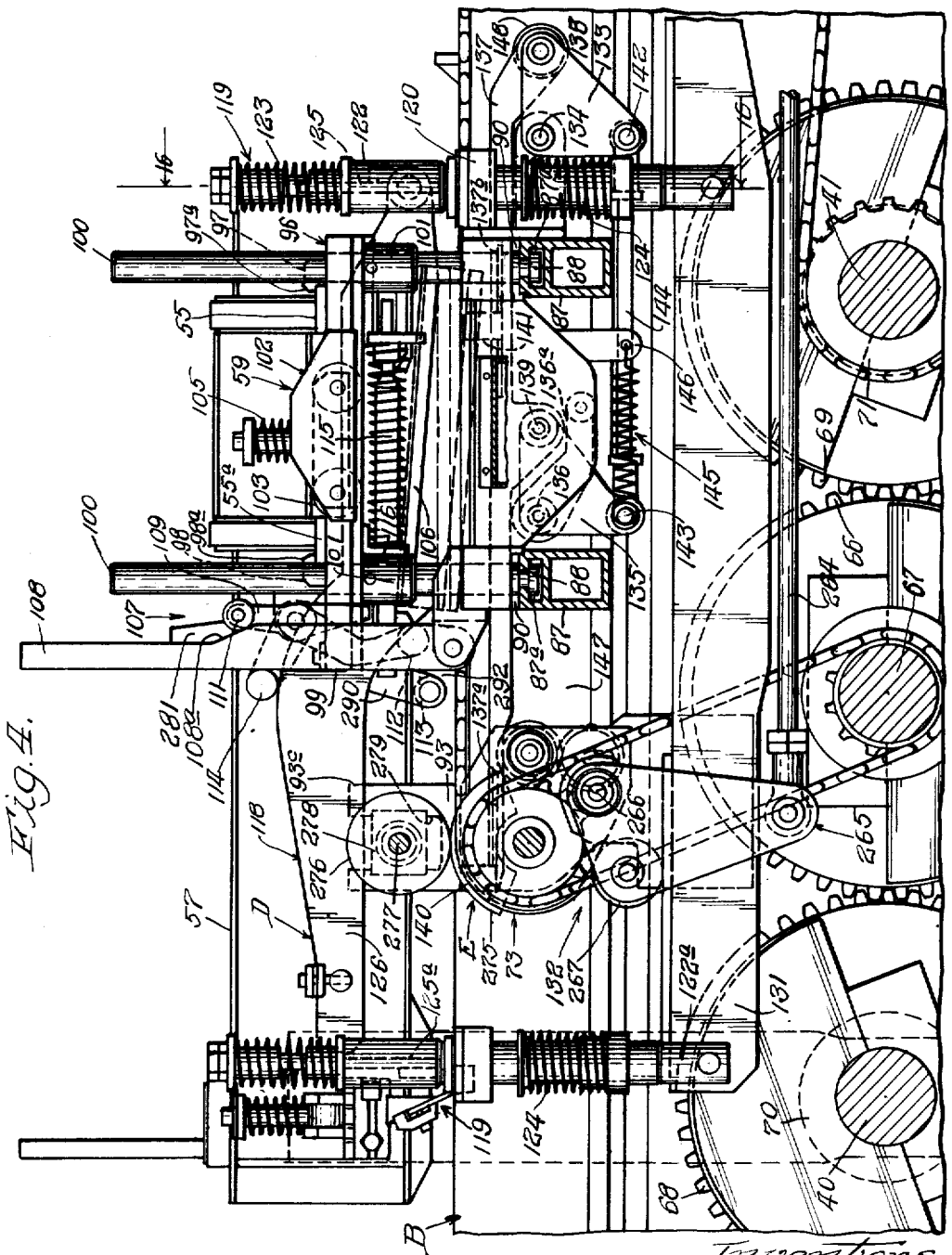

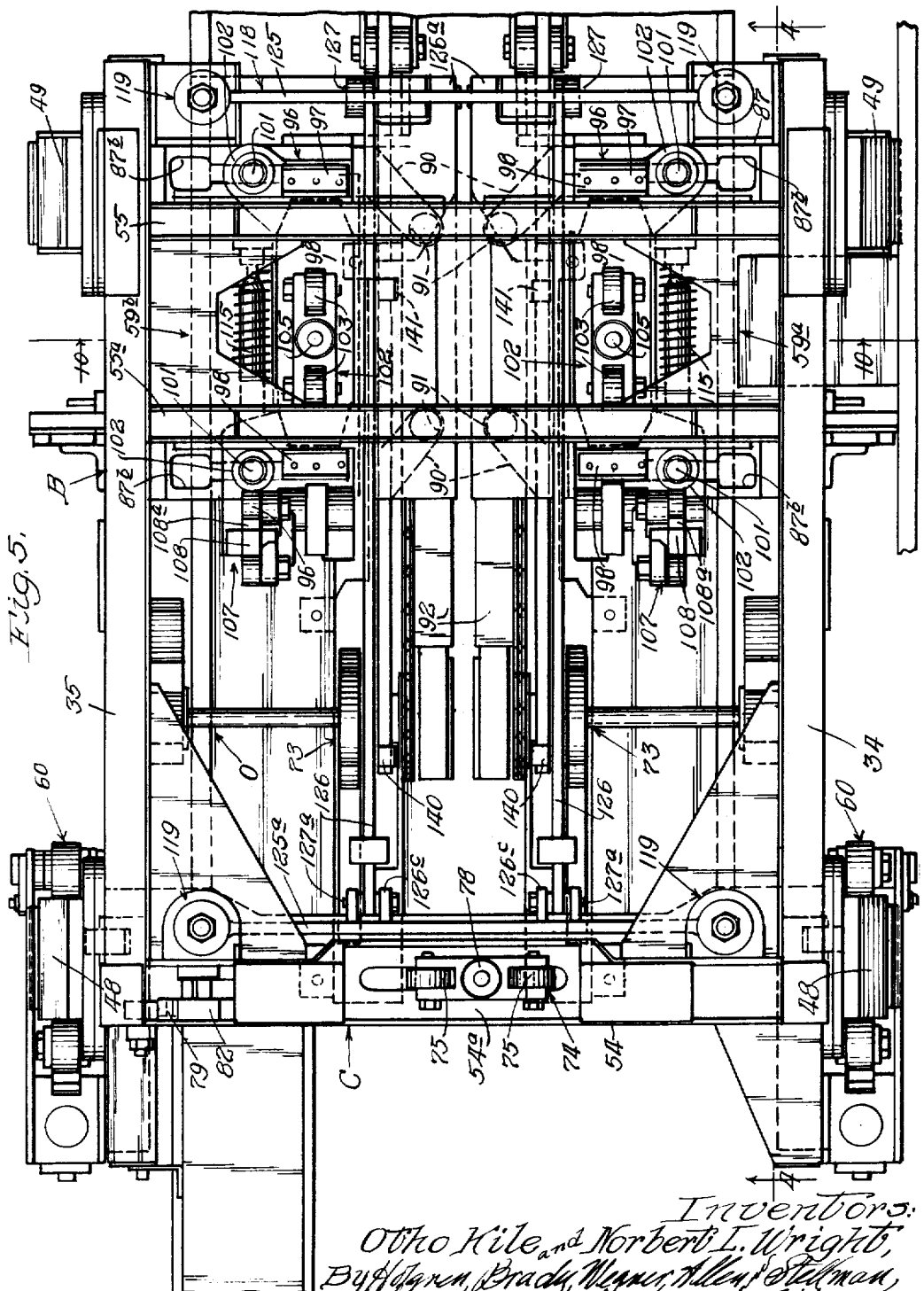

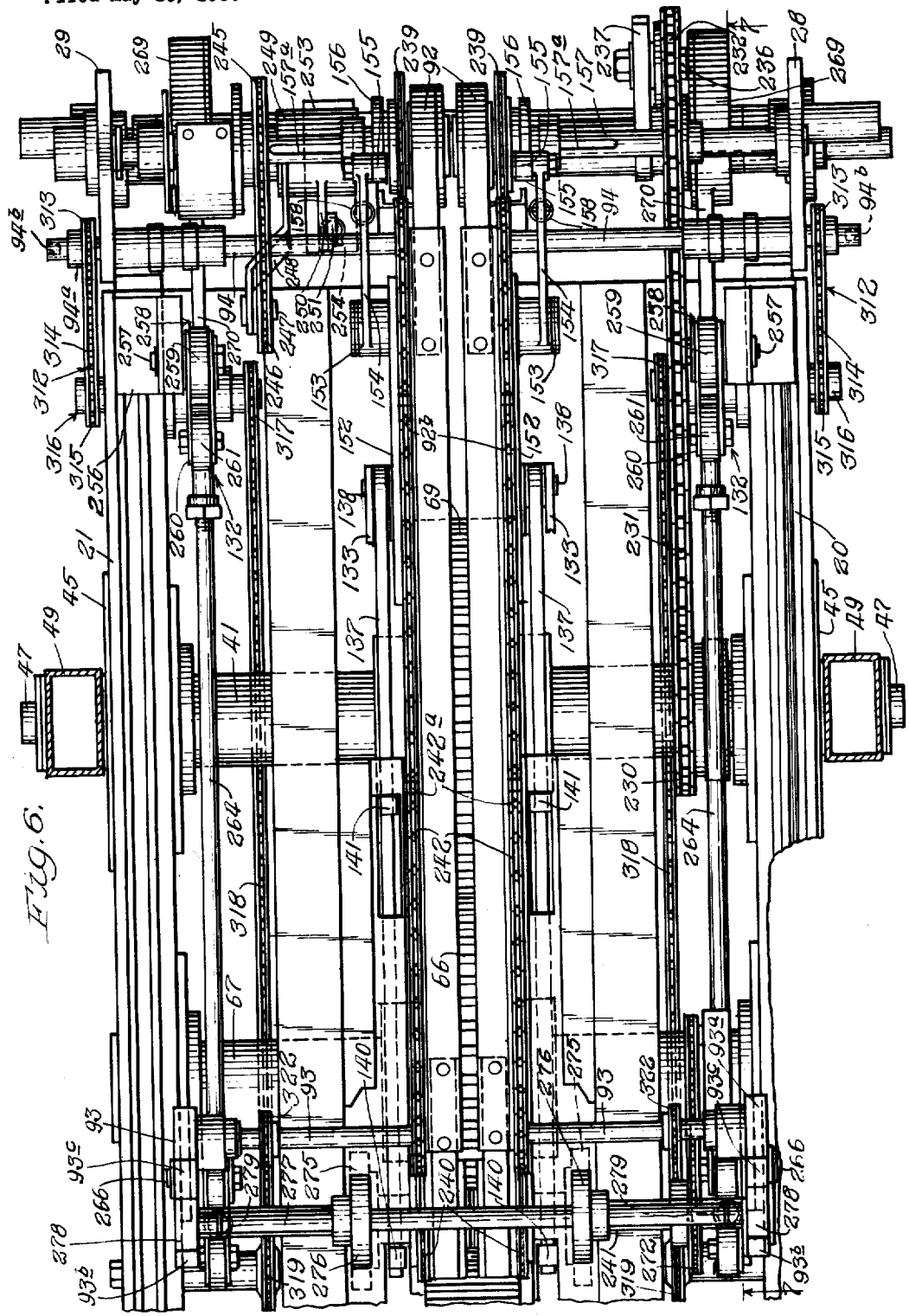

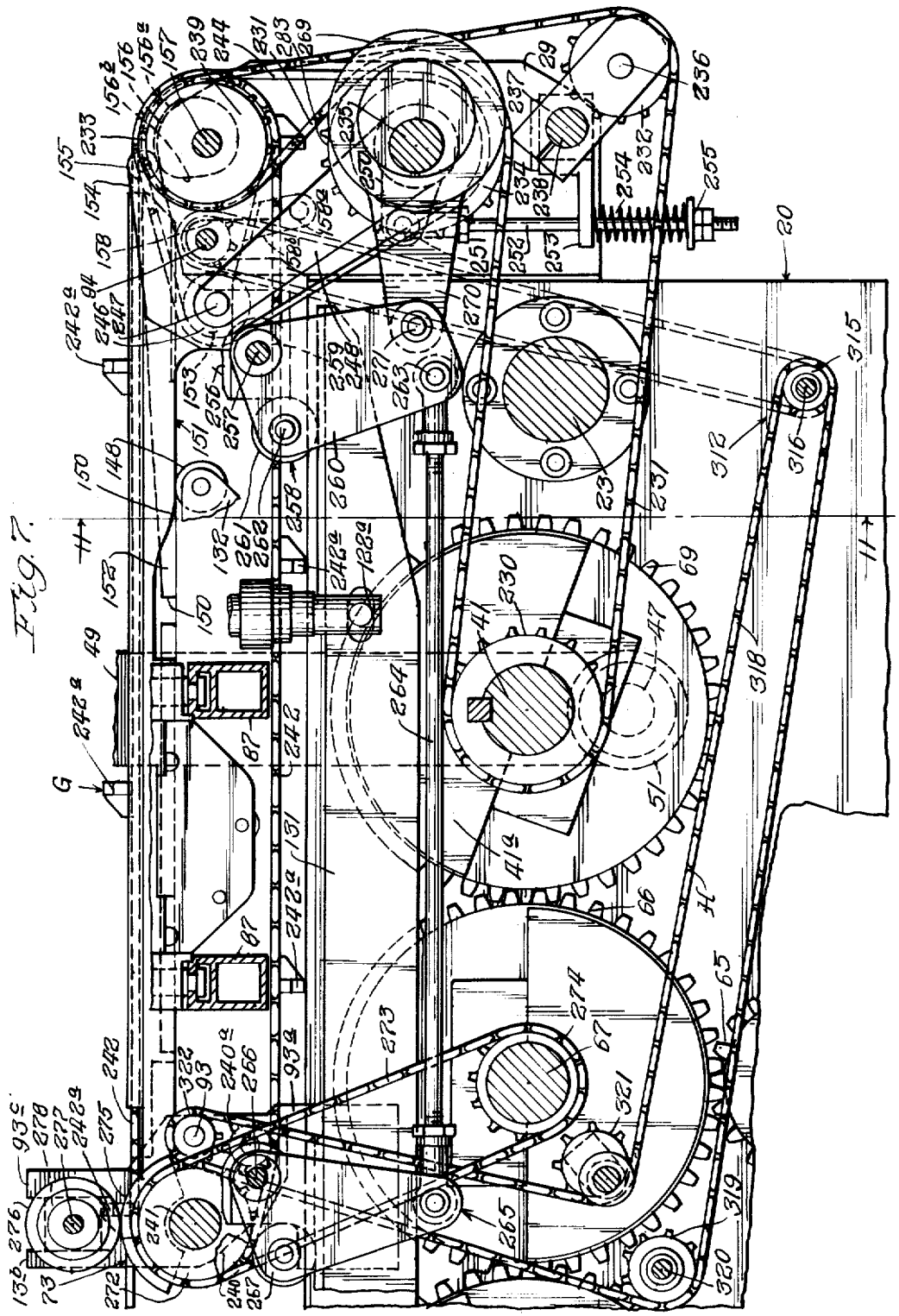

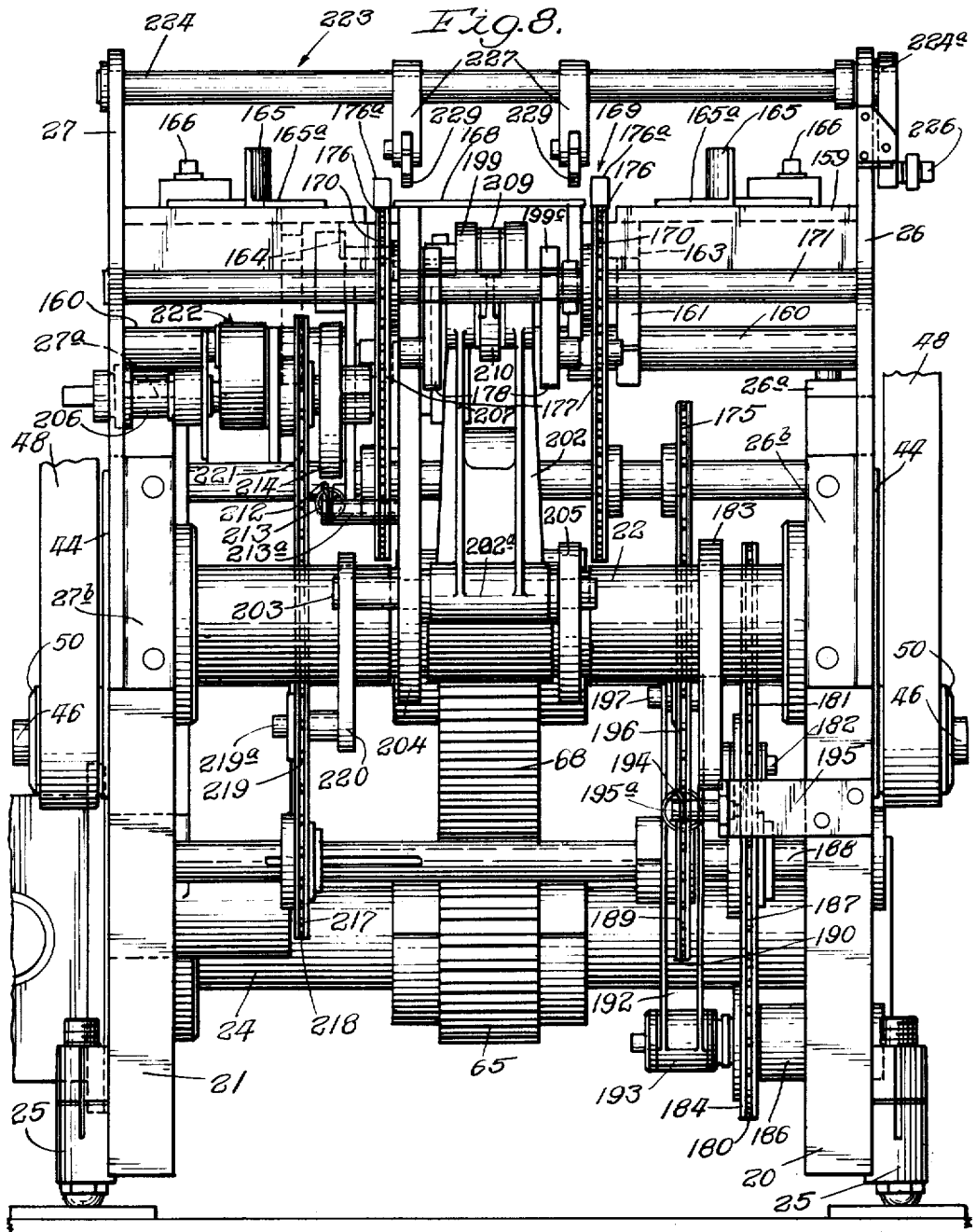

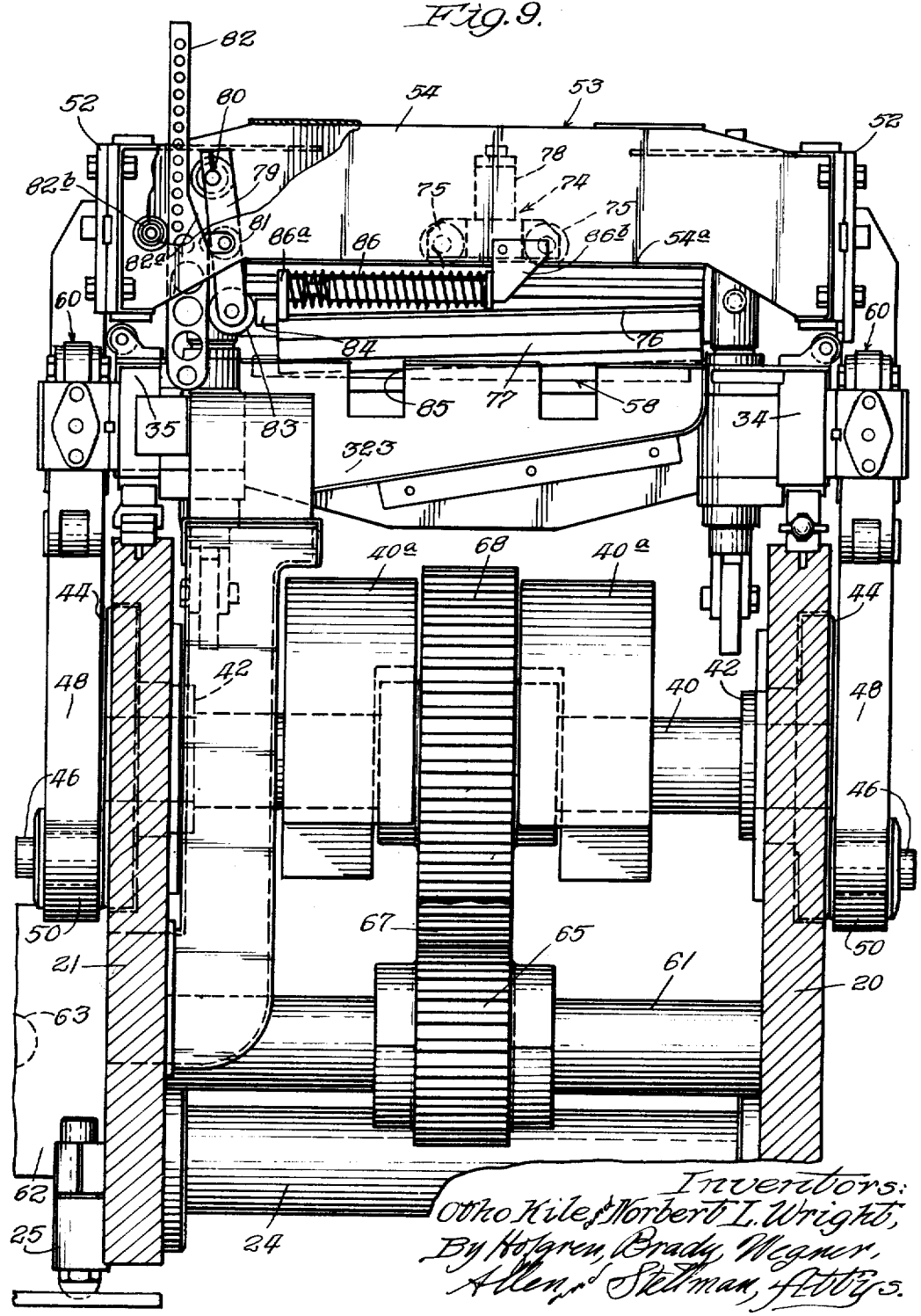

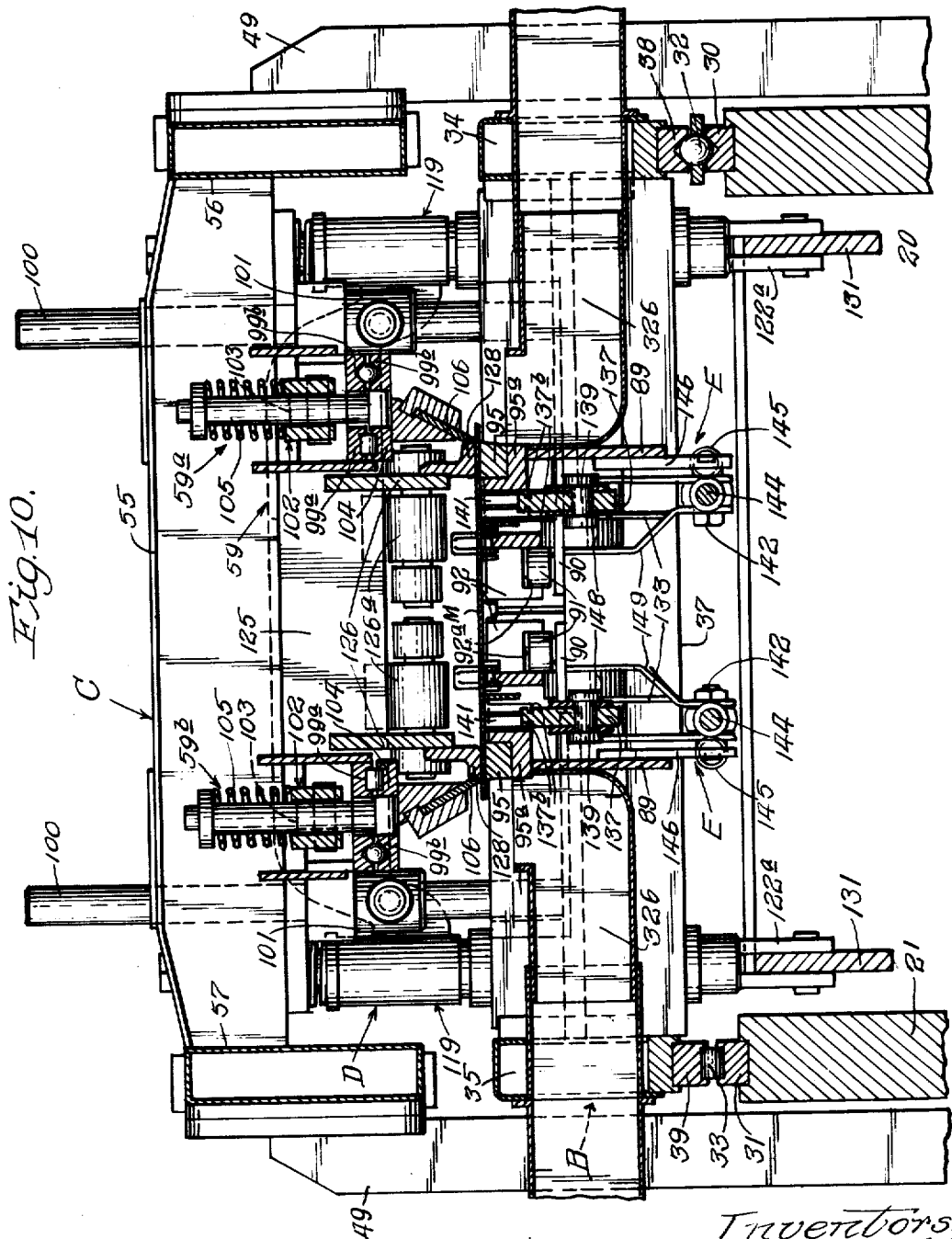

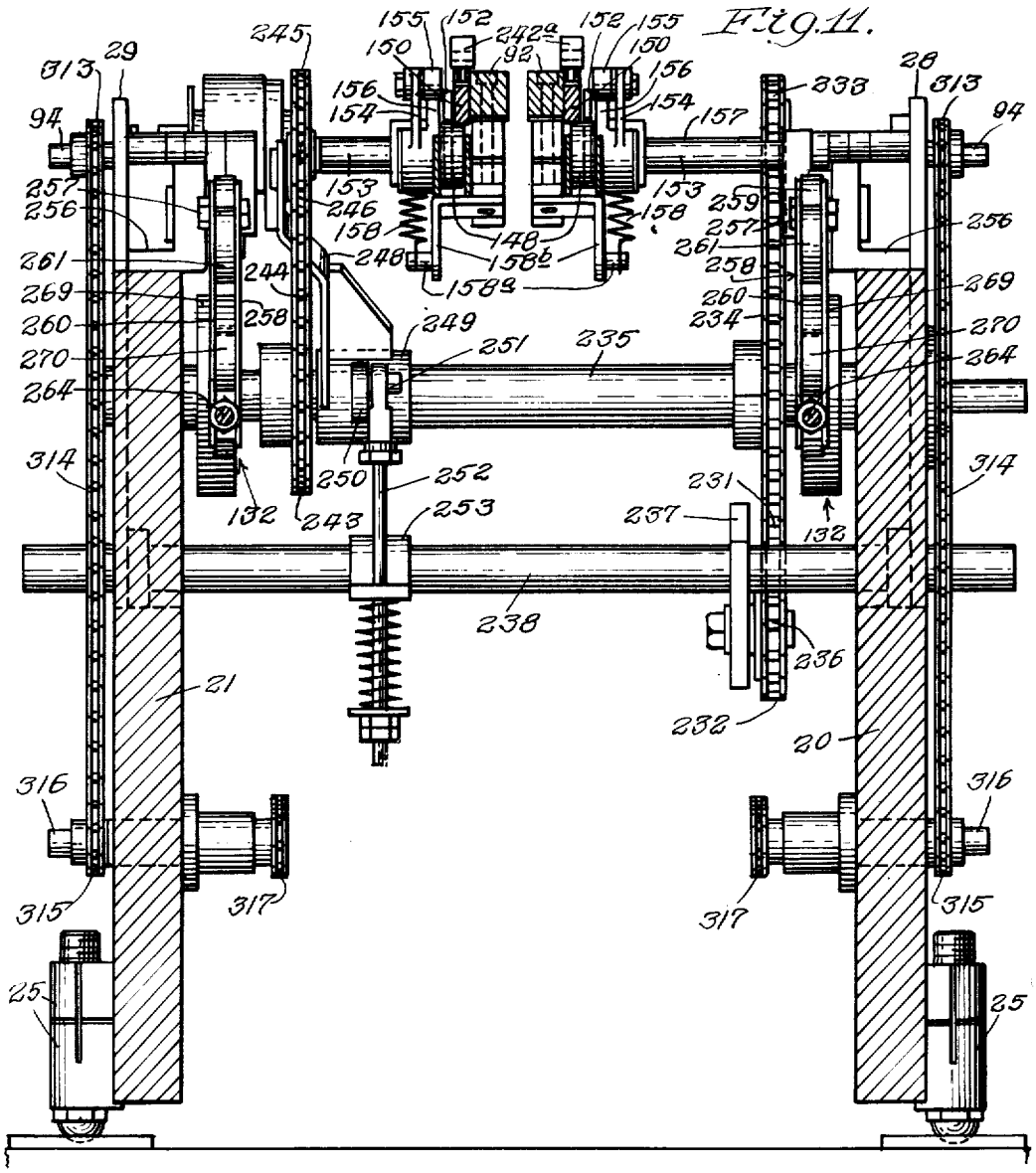

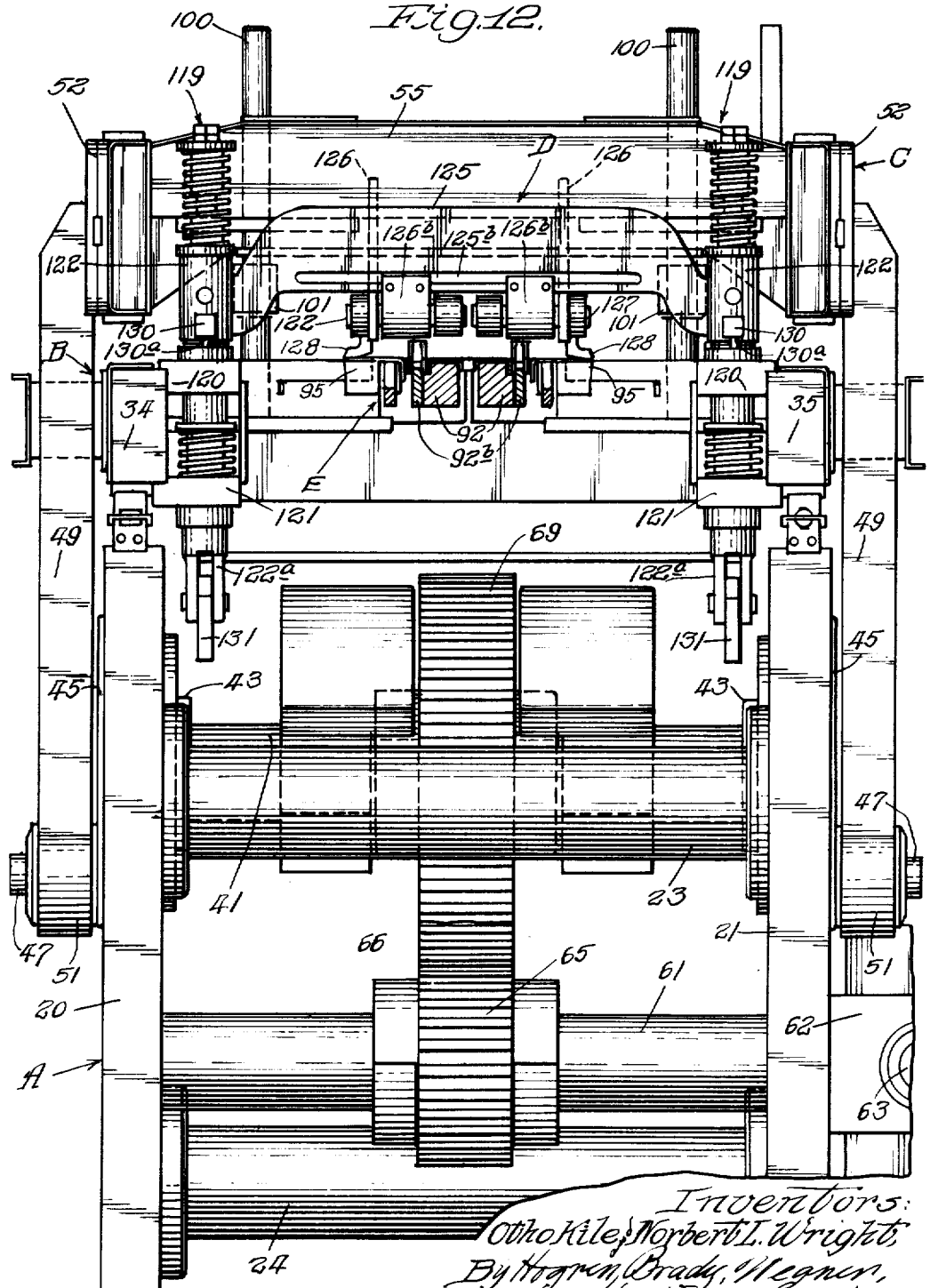

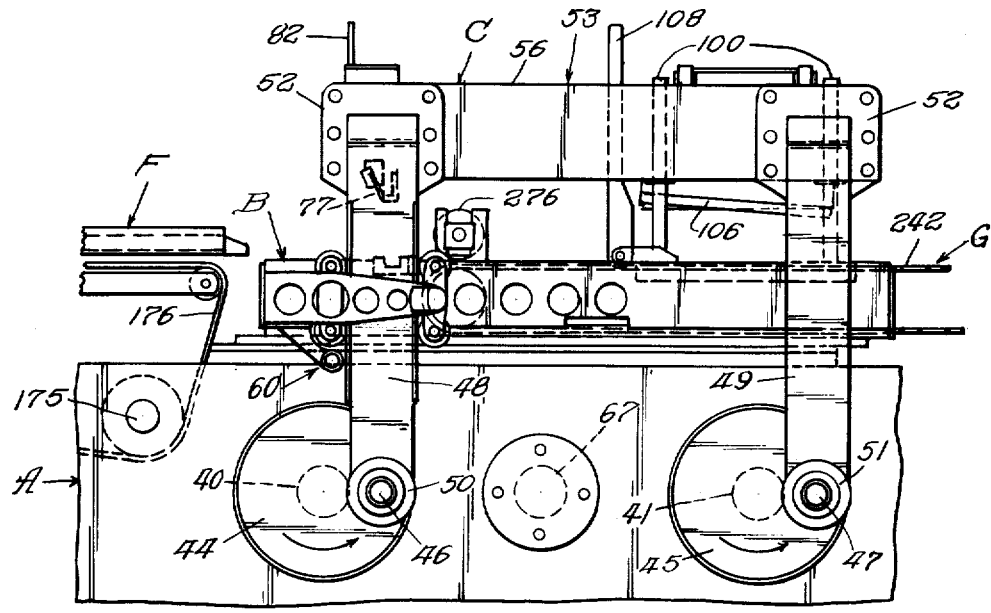
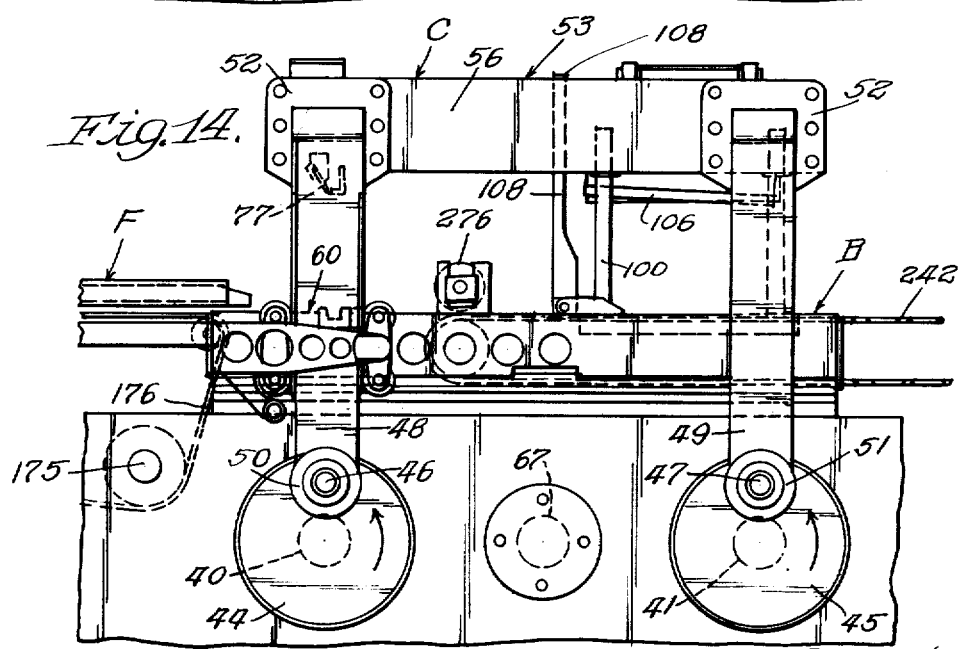

Feb. 25, 1964 O. KILE ETAL 3,122,041
MAGAZINE TRIMMING DEVICE
Filed May 19, 1960 17 Sheets-Sheet 14

Inventors:
Otho Kile and Norbert L. Wright,
By Hofgren, Brady, Wegner,
Allen, Stellman, Attys

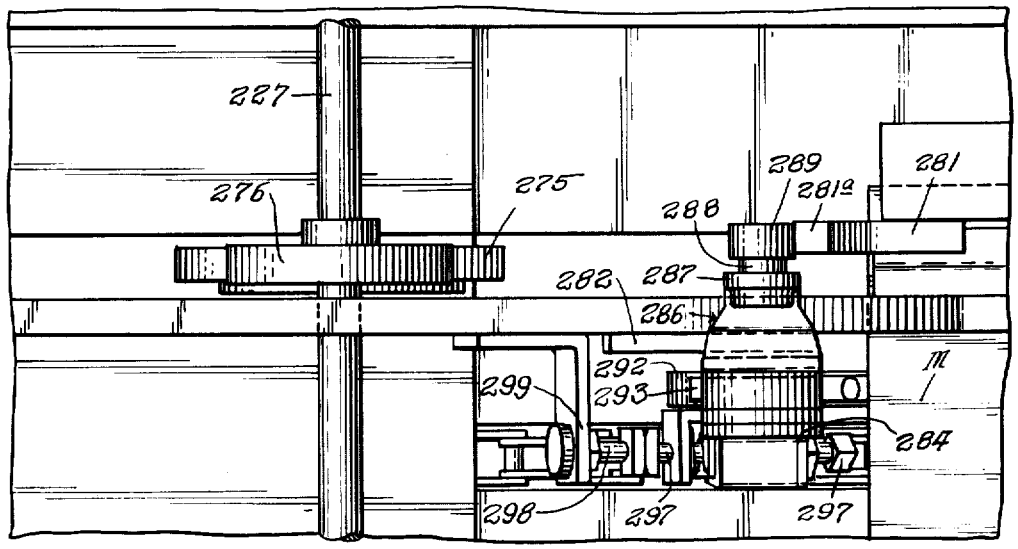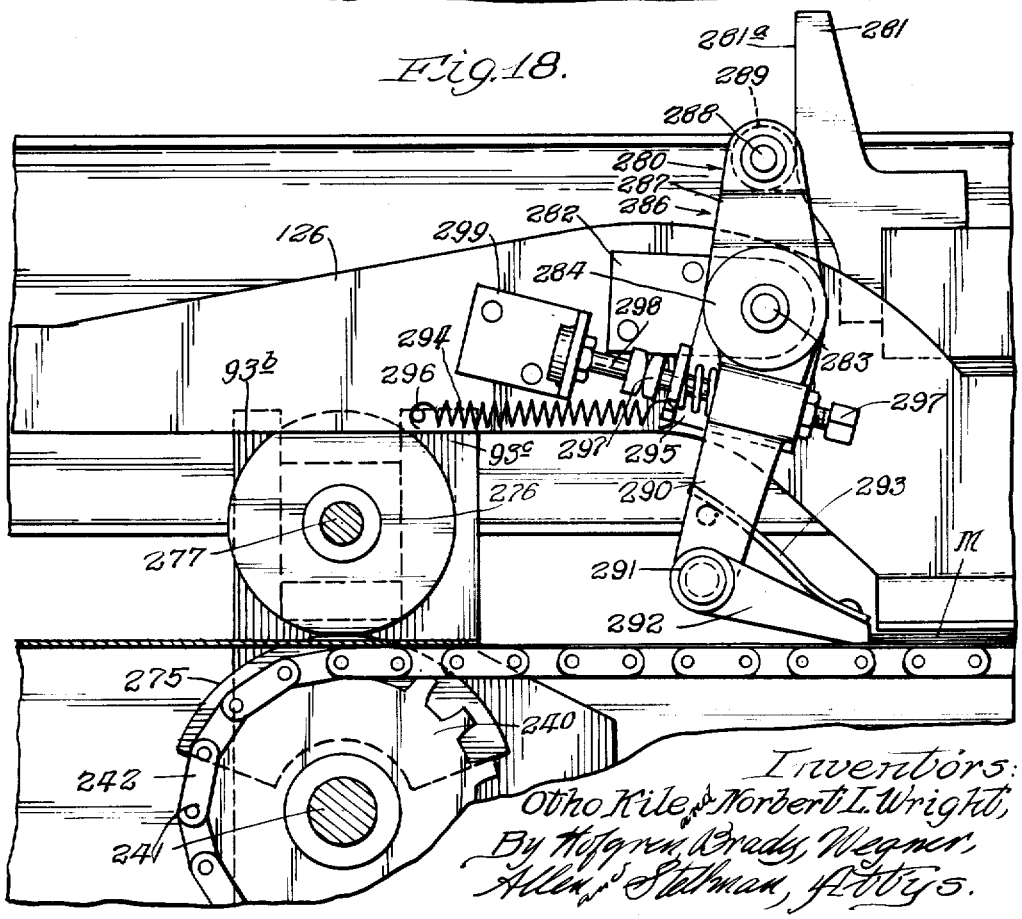

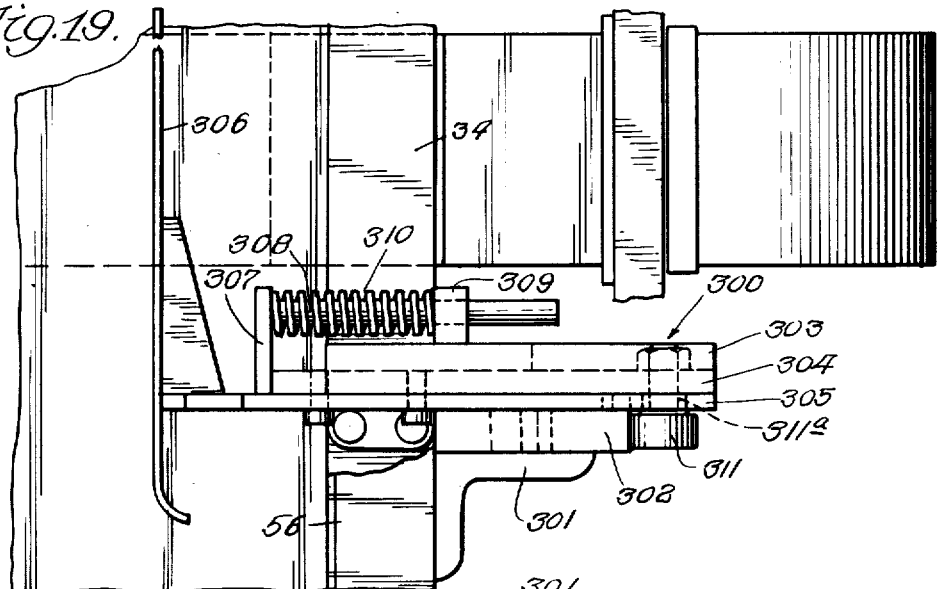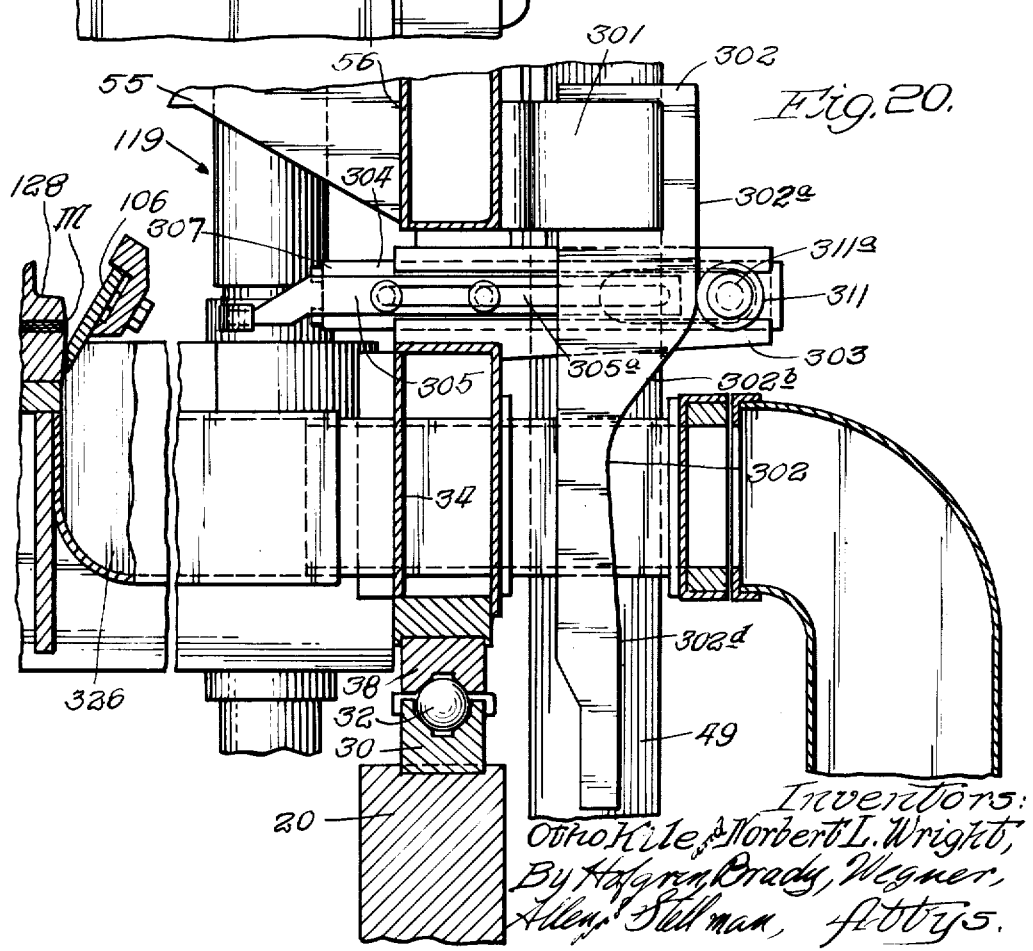

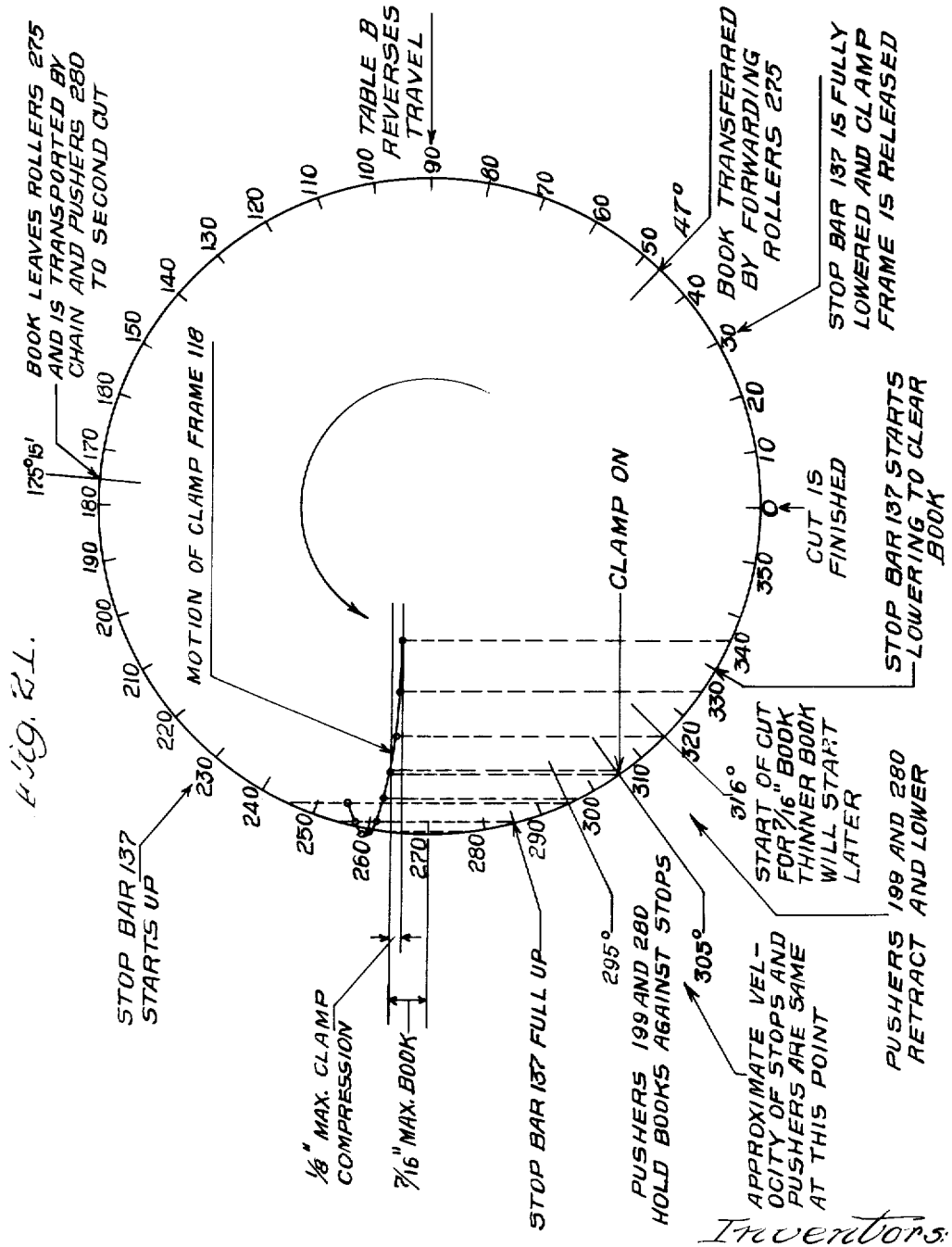

United States Patent Office 3,122,041
Patented Feb. 25, 1964

3,122,041
MAGAZINE TRIMMING DEVICE
Otho Kile, Homewood, and Norbert L. Wright, Chicago, Ill., assignors to R. R. Donnelley & Sons Company, a corporation of Delaware
Filed May 19, 1960, Ser. No. 30,148
16 Claims. (Cl. 83—155)

This invention relates to a trimmer for magazines, and in particular it relates to a trimmer which trims the margins of magazines as they move continuously across a base.

The principal object of the present invention is to provide a magazine trimmer which accurately trims the margins of magazines after they are stitched, and which operates at high speed while the magazines are continuously in motion.

Another object of the invention is to provide a magazine trimmer in which a front trimming blade and two end trimming blades are mounted on a frame which moves perpendicularly with respect to the magazines, and a separate longitudinal movement is applied to each blade as it trims a margin of the magazine.

Another object of the invention is to provide a magazine trimmer in which an infeed assembly and a carrier assembly cooperate with a reciprocating table to move magazines without any abrupt changes of speed.

Still another object of the invention is to provide a magazine trimmer in which the reciprocating motion of a table on which the magazines are carried for trimming, and the circular motion of a frame which carries the trimming blades, are both derived from a single set of cranks so as to simplify the coordination of the blade movement with the table movement and cause the blades to move vertically with respect to the table.

A further object of the invention is to provide a magazine trimmer in which the drive of all components is derived through the crankshafts, so as to simplify the problem of coordinating the operation of all the parts.

Yet another object of the invention is to provide a magazine trimmer in which the magazines are firmly anchored during a trimming operation by the cooperative action of retractable stop lugs against which the magazines abut, and retractable magazine clamps which clamp the magazines on a supporting surface and in contact with the stop lugs.

Still another object of the invention is to provide a single magazine clamp member which has a front clamp and a pair of parallel rear clamps, and which is carried on four floating corner supports so as to adjust freely to the absence of a magazine at one of the two clamping positions, or to accommodate itself to a folded or crumpled magazine.

The invention is illustrated in a preferred embodiment in the accompanying drawings, in which:

FIG. 1 is a side elevational view of a magazine trimmer constructed in accordance with the invention, the infeed end of the machine being at the left and the parts being at bottom dead center of the movement of the trimming blade assembly.

FIG. 2 is a fragmentary section on an enlarged scale showing the infeed and front trimming blade unit, taken substantially as illustrated along the line 2—2 of FIGURE 3;

FIG. 3 is a plan view of the infeed portion of the machine, partially in section;

FIG. 4 is a fragmentary sectional view of the magazine trimming mechanism, taken substantially as illustrated along the line 4—4 of FIG. 5;

FIG. 5 is a plan view of the magazine trimming mechanism;

FIG. 6 is a plan view of the central portion of the base with the upper part of the reciprocating table and the entire trimming blade assembly removed for clarity;

FIG. 7 is a fragmentary section of the base, taken substantially as illustrated along the line 7—7 of FIG. 6;

FIG. 8 is an end elevational view from the infeed end of the machine, taken substantially as illustrated along the line 8—8 of FIG. 2;

FIG. 9 is a transverse section taken substantially as illustrated along the line 9—9 of FIG. 2, with certain frame parts broken away for clarity;

FIG. 10 is a transverse section taken substantially as illustrated along the line 10—10 of FIG. 4;

FIG. 11 is a transverse section taken substantially as illustrated along the line 11—11 of FIG. 7;

FIG. 12 is a section taken substantially as illustrated along the line 12—12 of FIG. 7;

FIGS. 13, 14 and 15 are generally schematic views of the reciprocating table and trimming blade assembly in three positions of operation each of which is different from the position of the parts as seen in FIG. 1;

FIG. 17 is a fragmentary section on an enlarged scale, showing a magazine pusher for the end trimming blades;

FIG. 18 is a fragmentary plan view of the mechanism shown in FIG. 17;

FIG. 19 is a fragmentary plan view showing a jogger which accurately positions the magazines between the end trimming blades;

FIG. 20 is a fragmentary sectional view showing the mechanism of FIG. 19; and

FIG. 21 is a timing diagram showing the points in rotation of the blade cranks at which various operations occur.

*General Description*

Figure 15:
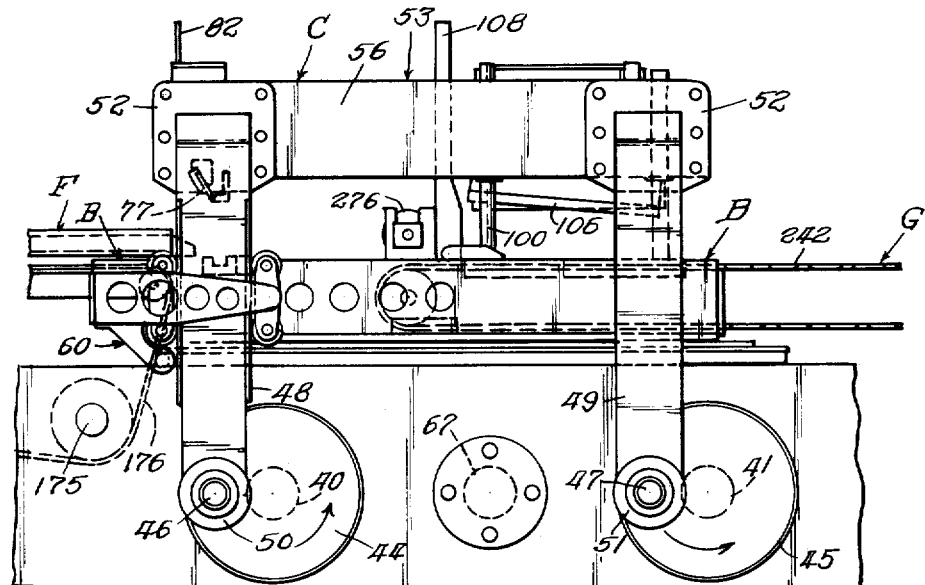

Referring now to the drawings, the magazine trimmer is seen in FIG. 1 to include a base A; a reciprocating table B carried on the base; a crank supported trimming blade assembly C which reciprocates table B through roller guides which act as a scotch yoke; an infeed assembly F and a carrier assembly G. As seen in FIG. 4, a clamp mechanism D is carried directly upon table B, as is a stop mechanism E.

The general assembly and operation of the magazine trimmer is as follows:

Trimming blade assembly C has a carrier frame supporting a front trimming blade unit to trim the front edge of a magazine and an end trimming blade unit which contains two spaced trimming blade structures with parallel blades to trim the ends of the magazine, and the frame is moved in a circular, or closed translatory path by reason of its crank mounting. At the same time, the scotch yoke connection between the cranks and reciprocating table B causes said table to reciprocate upon base A, so that the movement of the trimming blade units with respect to reciprocating table B is a straight vertical reciprocation.

Magazines are fed toward table B by a pusher of infeed assembly F, which is so timed that as the table starts to the right in FIG. 1 it receives a magazine which is abutted against elevated front lugs of stop mechanism E just as infeed velocity and table velocity are equal. The magazine is immediately clamped by a transverse front clamp bar of clamp mechanism D and is trimmed by the front trimming blade of assembly C. Both stop mechanism E and clamp mechanism D are cam actuated, and are retracted so that promptly upon completion of a cutting stroke the movement of table B toward the right in FIG. 1, coupled with the operation of a pair of forwarding rollers, moves the magazine into position upon lugged chains of carrier assembly G which continues to move the book forward as table B returns toward the infeed. As a second magazine is received upon table B the stop mechanism E raises to stop both magazines adjacent the trimming units. Side joggers position the first magazine precisely between the end trimming blades, whereupon clamp mechanism D clamps both magazines and the front edge of the second magazine is trimmed simultaneously with the two ends of the first magazine. Clamp mechanism D is elevated, stop mechanism E is retracted, and the first magazine is carried out of the trimmer by carrier assembly G while the second magazine is carried forward toward the end trimming unit and a third magazine is received on the table in position to be trimmed by the front trimming unit of blade assembly C. The trimmer operates continuously as above described.

*Base and Reciprocating Table*

Referring to the drawings in greater detail, it is seen in FIGS. 1, 8 and 12 that base A consists of a pair of rectangular main side plates 20 and 21 which are connected by large tie bars 22 and 23 near the two ends of the plates and adjacent the top, and a central tie bar 24 which is near the bottom of the plates. The base is supported upon adjustable feet 25 which are positioned at the bottom corners of the two side plates.

As seen in FIGS. 1 to 3, at the left hand, or infeed end of base A are infeed frame members 26 and 27 for infeed F which are supported, respectively, upon main side plates 20 and 21; while as seen in FIGS. 1, 6 and 7, at the right hand, or outfeed end of base A are carrier chain brackets 28 and 29 for carrier assembly G which are also supported, respectively, upon side plates 20 and 21. As seen in FIGS. 6 and 10, a ball bearing guideway 30 surmounts side plate 20, while a roller bearing guideway 31 surmounts side plate 21; and reciprocating table C is carried upon guideway 30 and 31 by a ball bearing set 32 and a roller bearing set 13.

Reciprocating table B is best seen in FIGS. 1, 2, 4, 5 and 10 to have a frame consisting of a pair of hollow side frame members 34 and 35, a front cross plate 36 (FIG. 2) and parallel hollow cross beams 87 (FIG. 4). Side members 34 and 35 are provided, respectively, with a ball bearing raceway 38 and a roller bearing raceway 39 reciprocably support table B upon base A on the bearing assemblies 32 and 33. A hold down assembly 37 (FIG. 1) loosely embraces each side of table B to prevent it from lifting off the base in case a magazine jams in it. Retractable clamp assembly D and stop assembly E are both carried upon reciprocable table B, as will be described in detail hereafter.

*Trimming Blade Assembly*

Trimming blade assembly C is seen in FIGS. 1, 2, 4, 5, 9 and 10 to include a front crankshaft 40 and a rear crankshaft 41 which are journalled, respectively, in trunnions 42 and 43 in side frame plates 20 and 21; and fixedly mounted on the ends of crankshafts 40 and 41 are front and rear crank discs numbered, respectively, 44 and 45 which are rotatably seated in circular recesses in the side frame plates. The front and rear crank discs are provided, respectively, with crank pins 46 and 47 on which front and rear supporting arms 48 and 49 are respectively journalled at 50 and 51, said arms being surmounted by mounting brackets 52 for the blade frame, indicated generally at 53, which includes spaced front cross plates 54 (FIG. 9), a rear cross beam 55 (FIG. 12) and longitudinal side beams 56 and 57 (FIGS. 1, 4 and 5). As seen in FIGS. 2 and 9, a front trimming blade unit, indicated generally at 58, is supported upon front cross plates 54; while as seen in FIGS. 4 and 5 an end trimming blade unit, indicated generally at 59, is supported between rear cross beam 55 and an intermediate cross beam 55a.

As best seen in FIGS. 1, 5, and 9, reciprocating table C has its hollow side members 34 and 35 provided with laterally projecting roller guide assemblies 60 which embrace front support arms 48 of trimming blade assembly C so that as the crank discs are rotated the blade frame 53 executes translatory motion in a circular path, while the roller guide assemblies 60 cooperate with support arms 48 to act like scotch yoke mechanism which reciprocate table B in coordination with the rotary movement of trimming blade frame C, so that the motion of the frame is a straight vertical reciprocation with respect to table B. Crank discs 44 and 45 rotate in the direction indicated by the arrows in FIG. 1 and thus are illustrated in that view at bottom dead center, which is the bottom of the trimming stroke of trimming blade units 58 and 59 and the mid point of travel of reciprocating table B from the infeed to the outfeed end of base A. Each of the trimming blade units 58 and 59 is provided with suitable mechanism for moving the trimming blades endwise during the trimming stroke, as will be described in detail in connection with those units.

*Main Drive*

Operation of infeed assembly F and carrier assembly G must be precisely coordinated with reciprocation of Table B and rotary movement of trimming blade assembly C, and accordingly all the components in the machine are driven from a single input shaft 61 which is supported between base side plates 20 and 21 and extends through side plate 21 into a gear box 62 which is mounted on said side plate and receives its power from a longitudinal shaft 63 having a pulley 64 at the outfeed end of the machine driven by a belt 64a from a motor (not shown). On input shaft 61 is a spur gear 65 meshing with an intermediate gear 66 on a power distributing shaft 67; and intermediate gear 66 in turn meshes with a front drive gear 68 on front crankshaft 40 and with a rear drive gear 69 on rear crankshaft 41. All components of infeed assembly F are driven off a sprocket 70 on front crankshaft 40; the drive for carrier assembly G and the operating mechanism of retractable magazine clamps D and part of that for stop mechanism E derived from a sprocket 71 on rear crankshaft 41; and a sprocket 72 on distributing shaft 67 provides a drive for a book forwarding mechanism, indicated generally at 73, which cooperates with reciprocating table C and carrier assembly G to toward each magazine from the location at which it is trimmed by front trimming blade unit 58 to the location at which it is trimmed by end trimming blade unit 59.

As seen in FIG. 1, counterweights 67a on distributing shaft 67, and counterweights 40a and 41a on shafts 40 and 41, balance the masses of reciprocating table B and blade assembly C.

*Blade Units*

Each of the three blades in assembly C has mechanism for moving the blade endwise during the trimming movement. Front blade unit 58 is fixed, while unit 59 has its two blade structures mounted for lateral adjustment to accommodate the unit to maazines of different lengths.

Referring now particularly to FIGS. 2, 4, 5 and 9, front trimming blade unit 58 includes a carriage, indicated generally at 74, which is positioned between front plates 54 and has a pair of rollers 75 upon which it may roll transversely along a cross plate 54a which is bolted to the bottom of the front plates. Suspended from carriage 74 is a blade carrier 76, and the top of said carrier rolls on a ball bearing assembly 76a and a roller bearing assembly 76b the upper races of which are cut in cross plate 54a (see FIG. 2). A front cutting blade 77 is secured beneath said carrier; and the carrier suspension includes an upright stabilizing spring assembly 78 on the carriage which thrusts the carrier up against its bearings with a force of about a half ton so as to eliminate any possible rocking movement of carrier 76 and blade 77.

Lateral movement of blade carriage 74 and blade 77 is produced by a cam lever 79 which is pivoted at 80 on beam 54 and has a follower roller 81 riding on an inclined cam face 81a of an upright bar cam 82, and a contact roller 83 on the lower end of lever 79 bears on a pressure pad 84 on the end of blade carrier 76 to push said carrier and the carriage 74 laterally as blade 77 shears through a magazine at the front trimming position. A backup roller 82b on front beam 54 bears on bar cam 82 behind follower roller 81, to absorb the thrust of the cam follower lever. Thus, blade 77 moves endwise as it cuts, thereby providing a very smooth action which does not produce ragged edges on the pages of a magazine. As best seen in FIG. 2, blade 77 is inclined toward the outfeed end of the machine, and when it shears a magazine it slides across the face of a fixed anvil 85 which is carried on a cross bar 85a welded to the top of the front plate 36 of table B. Lateral movement of blade carrier 76 is cushioned by a transverse return spring 86 one end of which is secured to a spring bracket 86a on blade carrier 76, and the other end of which is secured to a bracket 86b on front beam 54. The inclined mounting of blade 77 is important as a means of reducing weight and height of the blade frame, and also simplifies blade repair because only the short vertical blade face need be ground off if it is damaged.

Referring now particularly to FIGS. 4, 5 and 10, end trimming blade unit 59 has two longitudinally oriented blade structures, each of which is very similar to the front trimming blade unit just described; except that both structures are mounted for lateral adjustment so as to accommodate the blades to magazines of different lengths. Referring first to FIGS. 4 and 5, hollow cross beams 87 of table B have their upper portions of which are provided with T-slots 87a the outer ends of which are enlarged as seen at 87b in FIG. 5 to receive flanged guide studs 88 (FIG. 4) of arms 90 which are integral with a pair of laterally movable anvil supports 89 (FIG. 10) and have upstanding rollers 91 which are positioned to reciprocate in longitudinal recesses 92a of laterally movable longitudinal beams 92 on the outer faces of which are support rails 92b for the chains of carrier chain assembly E. Beams 92 are supported in base frame A for lateral adjustment upon a front carrier chain cross shaft 241 and a rear carrier chain cross shaft 157 which are seen in FIG. 7 to be supported, respectively, in main side plates 20 and 21, and in the carrier chain brackets 28 and 29. This mounting of beams 92 permits them to be laterally adjusted, and adjustment of said beams acts through the upright rollers 91 to slide anvil supports 89 laterally and thereby adjust anvils 95 which are carried on longitudinal bars 95a extending between the anvil supports. Adjustment of beams 92 also results in adjustment of the chains of carrier assembly G. The adjusting mechanism will be described in detail hereafter.

Each of the trimming blade structures 59a and 59b has support means, indicated generally at 96, at the two sides of the machine, and each of said support means includes a transverse rear support member 97 to which is bolted a gib 97a which slidably engages the rear margin of cross member 55, a front support member 98 to which is bolted a gib 98a which slidably engages the forward margin of cross member 55a, and a longitudinal beam 99 which is connected and supported by the support members 97 and 98. Four upright guide posts 100 which are secured to arms 90 of anvil supports 89 extend through bosses 101 in the upper support member 97, so that lateral adjustment of the lower frame members carrying anvils 95 acts through guide posts 100 to also produce lateral adjustment of support means 96.

Referring again to FIGS. 4, 5 and 10, each of the end trimming blade units has a carriage 102 supported on rollers 103 for movement longitudinally with respect to blade frame 53 on the upper surfaces of longitudinal beams 99 of support means 96. Blade carriers 104 are best seen in FIG. 10 to be suspended beneath longitudinal beams 99 by upright stabilizing spring assemblies 105, and each of the blade carriers 104 may move freely along the underside of associated structural member 99 by reason of a roller bearing set 99a and a ball bearing set 99b. Rigidly mounted beneath each blade carrier 104 is an end trimming blade 106, said blades cooperating with anvils 95 to shear the end margins of a magazine. The anvils are mounted in members 95a which are welded onto anvil supports 89.

Endwise movement of trimming blades 106 is provided by a pair of cam mechanisms, indicated generally at 107 (FIGS. 4 and 5). As best seen in FIG. 4, each cam mechanism 107 includes an upright bar cam 108 with an inclined cam face 108a, together with a cam arm 109 which is pivoted at 110 on support means 96. There is a cam follower 111 at the upper end of arm 109 and an actuating roller 112 at its lower end which cooperates with a depending shoulder 113 on blade carrier 104 to pull the blade carrier longitudinally on the cutting stroke and thus move cutting blades 106 endwise as they shear the ends of a magazine. A backup roller 114 which is substantially opposite cam follower 111 acts to absorb the operating thrust of cam lever 109 on bar cam 108. Longitudinal return movement of each blade carrier 104 is produced by a spring 115 which has one end secured to a bracket 116 on one of the hollow bushings 101, while the other end bears on a bracket 117 on blade carrier 104.

*Clamp Mechanism*

Figure 16:
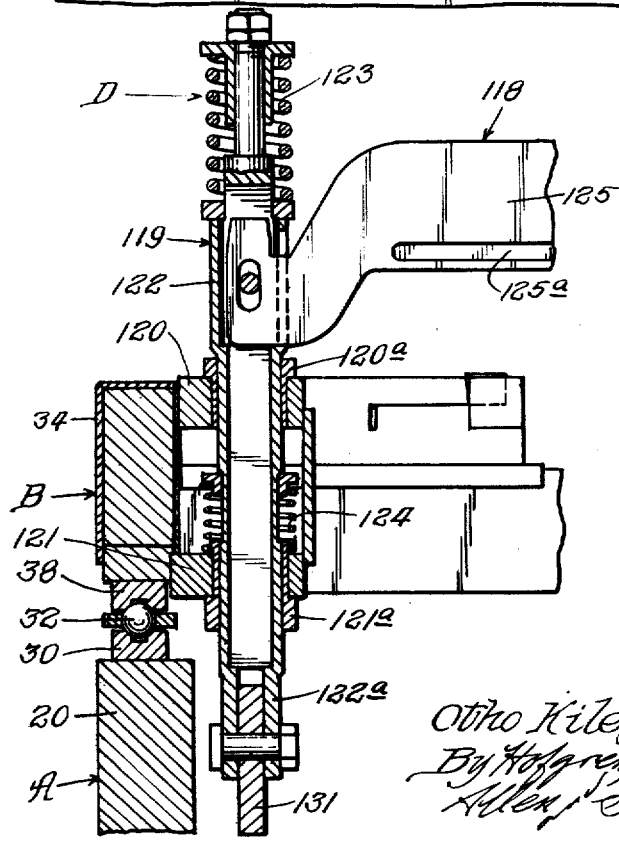
FIG. 16 is a fragmentary section on an enlarged scale taken substantially as illustrated along the line 16—16 of FIG. 4.

Magazine clamp mechanism D is also supported upon reciprocating table B, and consists of an effectively rectangular frame, indicated generally at 118, which is mounted for vertical sliding movement upon four upright corner supports, indicated generally at 119. As best seen in FIG. 16, each corner support 119 includes a top bracket 120 and a bottom bracket 121, both extending inwardly from the adjacent side member of reciprocating table B, said brackets being provided, respectively, with bushings 120a and 121a. Slidable in the bushings is a post 122 which is floatingly mounted between an upper spring assembly 123 and a lower spring assembly 124. Frame 118 includes a rear cross member 125 and a front cross members 125a which are carried on posts 122 of corner supports 119 as seen in FIG. 16, and parallel longitudinal clamp frame plates 126 adjustably secured to the cross members and extending between the two end cutter structures 59a and 59b. As seen in FIG. 10, each longitudinal plate is provided with longitudinal clamp bars 128 which extend outwardly so that their outer extremities are immediately adjacent end trimming blades 106. Similarly, front clamp cross member 125 is provided with a transverse clamp bar 129 which has a forwardly extending lower margin terminating immediately adjacent front trimming blade 77. Thus, front clamp bar 129 firmly clamps a magazine against anvil 85, while clamp bars 128 clamp a second magazine firmly against anvils 95, so that the front trimming blade 77 and the end trimming blades 106 may shear cleanly across the margins of the magazines which are firmly held by the clamping bars.

Since clamp bars 128 must be laterally adjustable to cooperate properly with anvils 95 and blades 106, they are supported for transverse sliding movement in cross members 125 and 125a. As seen in FIGS. 5, 10 and 12, there are gussets 126a at the rear of longitudinal clamp plates 126, and brackets 126b which may slide in a slot 125b in cross member 125, and to which gusset 126a and longitudinal clamp plate 126 are secured by pins 127. FIG. 5 shows a broadly similar structure at the front, with sliding brackets 126c to which clamp plates are secured by pins 127a.

At the rear of clamp frame 118, on rear corner post members 122, are stops 130 having adjustable depending stop fingers 130a which may bear on brackets 120 so as to limit downward movement of the rear of the frame and thus prevent it from tilting when the first magazine of a run is clamped in the front trimming position by clamp bar 129 (FIG. 2) and there is no magazine at the end trimming position to be clamped by clamp bars 128 (FIG. 10).

As seen in FIGS. 4 and 16, each corner post 122 of the clamping assembly D has a bifurcated lower end 122a, and a pair of actuating beams 131 are supported in said bifurcated lower ends to extend longitudinally with respect to a base A of the trimming machine. Thus, the entire clamping mechanism D may be caused to rise and fall in timed relationship with the reciprocation of table B and the translatory motion of blade assembly C by a suitable actuating cam mechanism, indicated generally at 132 in FIGS. 4 and 7. Operation of cam mechanism 132 will be described in detail in connection with other actuating elements of the entire unit.

*Stop Mechanism*

Stop mechanism E is best seen in FIGS. 4, 5, 7 and 10 to include a pair of bifurcated rear bell cranks 133 which are pivoted at 134 on reciprocating table B, a pair of bifurcated front bell cranks 135 which are supported on pivots 136 in brackets 136a, and a pair of parallel stop bars 137 which are pivotally mounted on rear bell cranks 133 at 138 and on front bell cranks 135 at 139. Each of the stop bars is provided with a front stop lug 140 which is seen in FIG. 4 just ahead of forwarding roller assembly 73, and which is adjustable longitudinally of the stop bar in slots 137a. Front stop lugs 140 are adjusted on stop bars 137 so as to be located a predetermined distance from the plane of front trimming blade 77, and this distance varies depending upon the width of the magazines which are being trimmed. Also mounted on each stop bar 137 is a rear stop lug 141 which is adjustable longitudinally of the stop bar in slots 137b (see FIGS. 4 and 10), so as to be a predetermined distance from front stop lugs 140; and the relative positions of lugs 141 with respect to one another assures that the front edge of the magazine is perpendicular to the end blades for a square cut.

Also as seen in FIGS. 4 and 10, bell cranks 133 and 135 have connecting rod pivot pins 142 and 143, respectively, to receive connecting rods 144, and tension springs 145 are connected at one end to each of the pivot pins 143 and to spring brackets 146 on anvil supports 89 so as to urge the bell cranks counterclockwise and normally elevate stop bars 137.

Pivotal movement of bell cranks 133 and 135 against the urging of tension springs 145 is accomplished by a pair of cam follower rollers 148 each of which is supported on one of the pivots 138 between a bracket 149 and the side of one of the bell cranks 133, and the rollers ride on cam faces 150 which are cut in the bottoms of longitudinal beams 92. The stop lugs 140 and 141 must be below the level of magazines carried on reciprocating table B except for a relatively short time immediately preceding and during the cut of the trimming blades. Thus, cam face 150 has an inclined portion 150a toward the front, and an elevated portion 150b which permits the springs to elevate the stop bars as the table approaches the forward limit of its travel.

A cam of this type necessarily will permit stop bars 137 to rise, and will return them to retracted position, at corresponding points on the two sides of the point of maximum forward travel of the table; but if the bars were permitted to rise as soon as the rollers traverse inclined face 150a the stops would not clear a magazine being fed through forwarding rollers 73. Thus, a delay mechanism is provided to hold the bars down until the table has almost completed its forward travel.

Delay in the elevation of stop bars 137 is caused by a delay cam mechanism, indicated generally at 151 (FIG. 7) which includes a pair of longitudinally extending delay fingers 152 which are pivoted at 153 on brackets mounted on base side plates 20 and 21. Each delay finger 152 has a rearwardly extending cam follower arm 154 provided with a roller 155 riding on a cam 156 which is journalled on a rear cross shaft 157 which extends between rear side plates 28 and 29 and also carries sprockets for lugged carrier chains of the assembly G, as will be described in connection with that assembly. A follower spring 158 holds roller 155 in contact with cam 156, and delay fingers 152 bear upon the rear of stop bars 137 behind the pivots 134 for bell cranks 133. Cam 156 is so oriented with respect to follower roller 155 that delay fingers 152 are held down by cam lobe 156a until table B is very close to the forward limit of its travel. Follower rollers 155 then ride onto the low cam lobe 156b, delay fingers 152 rise rapidly, and tension springs 145 elevate stop bar 137. Return of the stop bars to their retracted positions after the trimming blades have performed a trimming operation is accomplished by the return travel of cam follower rollers 148 over the inclined cam faces 150a, so that the long, slender delay fingers 152 do not carry the load of pivoting the bell cranks 133 and 135 against the tension of spring 145.

*Infeed Assembly*

Infeed assembly F is best seen in FIGS. 2, 3 and 8 to be mounted between the left hand ends of side members 20 and 21 of base A, and more particularly between infeed side plates 26 and 27. The frame for the infeed includes a front cross member 159 and an intermediate cross bar 160 upon which is supported a pair of short intermediate cross beams 161 and 162, and longitudinal infeed conveyor beams 163 and 164 are supported on the cross member 159 and intermediate cross beams 161 and 162, respectively. End cross rail 159 and intermediate beams 161 and 162 also provide supports for magazine side guides 165 which are laterally adjustable on their supporting brackets 166 and 167 so as to accommodate magazines of different lengths. Side guides 165 have horizontal supporting plates 165a which are coplanar with a center plate 168 and cooperate therewith to support magazines as they are moved toward reciprocating table B by an infeed carrier chain mechanism, indicated generally at 169.

Infeed carrier chain mechanism 169 includes a pair of transversely spaced front sprockets 170 which are journalled upon a front cross shaft 171, a pair of rear sprockets 172 each of which is journalled upon a stub shaft 173, one stub shaft 173 being on longitudinal infeed conveyor beam 163 and the other upon corresponding beam 164, a pair of infeed chain drive sprockets 174 keyed upon an input shaft 175, and a pair of parallel infeed chains 176 which are trained over the pairs of sprockets 170, 172 and 174, each of said chains 176 being tensioned by an idler sprocket 177 carried in a lever arm 178 which is mounted upon front cross shaft 171. Infeed chains 176 are provided with lugs 176a which push magazines toward reciprocating table B.

Infeed F is operated by a sprocket and chain drive, indicated generally at 179. As previously pointed out, power to drive the infeed is derived from a sprocket 70 on front crank shaft 40, and a drive chain 180 is trained around sprocket 70, which rotates counterclockwise as shown by the arrow in FIG. 2. Drive chain 180 then passes around a sprocket 181 which is carried on a stub shaft 182 in a bracket 183 clamped on cross beam 22, thence around a sprocket 184 (FIG. 2a) which is seen in FIG. 8 to be journalled on a shaft 185 carried in a boss 186 near the base of side frame member 20, and chain 180 is then passed over a drive sprocket 187 for an infeed power shaft 188 so as to turn said shaft clockwise as indicated by the arrow in FIG. 2. Shaft 188 carries an infeed input sprocket 189 for an infeed input chain 190 which is also trained around an input sprocket 191 on input shaft 175. Tensioning means for input chain 190 takes the form of an arm 192 having a hub 193 by means of which it is pivoted on stub shaft 185, a tension spring 194 secured to arm 192 and to a pin 195a on spring bracket 195 at the rear of main side plate 20, and a tensioning sprocket 196 on a spindle 197 at the upper end of take-up arm 193, said sprocket 196 meshing with input chain 190.

Since each magazine delivered by infeed chains 176 must be butted firmly against front stops 140 of stop mechanism E, the infeed mechanism F also includes a reciprocating and retractable pusher mechanism, indicated generally at 198, which pushes each magazine away from pusher lugs 176a and into contact with stops 140.

Pusher mechanism 198 includes a pusher member, indicated generally at 199, which is supported on and reciprocated by a four bar linkage, indicated generally at 200, and a cam mechanism, indicated generally at 201, which raises and lowers the forward end of pusher 199 in timed relationship with its reciprocation.

Four bar linkage 200 includes a bifurcated rocker arm 202 having a hub 202a by means of which it is rockably supported upon a cross shaft 203 which is carried in bracket plates 204 and 205, both of which are clamped on cross beam 22. A cam shaft 206 which is journalled in infeed side plate 27 and in bracket plate 204 carries a crank 207 which is pivoted at 208 to one arm of a bell crank 209. The bell crank is fulcrumed at 210 between the arms of bifurcated rocker 202, and the other arm of the bell crank is pivotally connected at 209a between spaced arms 199a at the rear of pusher 199.

Cam mechanism 201 includes a rock shaft 211 to which is secured a depending cam follower arm 212 at the lower end of which is a tension spring 213 which connects follower arm 212 to a spring stud 213a at the rear of bracket plate 204. Cam arm 212 has a cam follower roller 212a which bears upon a cam 214 on cam shaft 206. Extending forwardly from rock shaft 211 is a rigid arm 215 the forward end of which is pivotally connected at 215a to a bearing tube 216 within which pusher 199 is reciprocably carried. Since cam follower arm 212 and rigid arm 215 are both fixedly secured to rock shaft 211, those elements cooperate to act as a bell crank, so the rotation of cam 214 rotates rock shaft 211 to raise and lower bearing tube 216, and thus elevate and retract the forward end of pusher 199. As best seen in FIG. 3, the front of pusher 199 has a cross arm 199b at the ends of which are forwardly extending pusher arms 199c with upturned front ends 199d which project upwardly between infeed chains 176 when the pusher is advanced and elevated, and which are below the level of the infeed table when the pusher is retracted.

The drive for infeed pusher mechanism 198 is derived from a sprocket 217 on infeed power shaft 188, and a pusher drive chain 218 is trained around sprocket 217, thence around a small takeup sprocket 219 mounted on a spindle 219a which is carried at the lower end of an arm 220 adjustably clamped to cross shaft 203. From takeup sprocket 219, pusher drive chain 218 passes around a sprocket 221 on cam shaft 206. Thus, cam shaft 206 rotates in the direction of the arrow in FIG. 2, so as to operate crank 207 of four bar linkage 200, and also rotate cam 214 of cam assembly 201.

In order to avoid unnecessary damage to the mechanism in case a magazine jams in the infeed, cam shaft 206 is provided with a single tooth dog clutch mechanism, indicated generally at 222 in FIG. 8, which automatically becomes disengaged if the infeed becomes jammed due to the presence of a folded or crumpled magazine. Disengagement of clutch 222 opens a safety switch to stop the operation of the entire trimming mechanism until the damaged magazine can be removed and the machine restarted by the operator.

The infeed mechanism also includes a conventional hold down arrangement, indicated generally at 223, including cross bars 224 and 225 which extend between the upper portions of infeed side plates 26 and 27 and have depending connector arms 224a and 225a, respectively, connected by a link 226 to produce a parallel motion of hold down arms 227 on cross bar 224 and hold down arms 228 on cross bar 225. A pair of hold down bars 229 are pivotally supported in arms 227 and 228 between infeed chains 176.

*Carrier Chain Assembly and Clamp and Stop Cam Operation*

Referring now particularly to FIGS. 6, 7 and 11, carrier chain G, together with its drive mechanism and the cam drive for clamp mechanism D and for delay fingers 152 of stop mechanism E are all driven from a sprocket 230 on rear crank shaft 41, and a drive chain 231 wraps around sprocket 230, then around an adjusting sprocket 232, then around an upper sprocket 233 journalled on rear carrier shaft 157, and finally wraps around the underside of a sprocket 234 which is keyed to a cam shaft 235 journalled between rear frame side plates 28 and 29. Adjusting sprocket 232 is carried on a stub shaft 236 which is supported on a clamp arm 237 adjustably clamped to a bottom tie bar 238 which connects the lower end portions of rear side plates 28 and 29.

Carrier chain assembly G includes chain drive sprockets 239 which are keyed in slots 157a on shaft 157, front chain idler sprockets 240 journalled on a cross shaft 241, tensioning sprockets 240a, and a pair of carrier chains 242 which are trained over said sprockets and provided with magazine pusher lugs 242a. Carrier chains 242 are driven by means of a drive sprocket 243 on cam shaft 235, from which a drive chain 244 passes around a drive sprocket 245 and then around a tensioning sprocket 246 which is journalled on a stub shaft 247 of a rocker arm 248. Sprocket 245 is mounted on a single tooth dog clutch 245a, which acts as a safety device like clutch 222 in the infeed.

As best seen in FIG. 11, rocker arm 248 has a boss 249 by means of which it is journalled on cam shaft 235. A spring arm 250 on boss 249 has a pin 251 for a spring guide rod 252 which extends through a spring bracket 253 on cross bar 238, and a compression spring 254 is coiled around rod 252 below bracket 253 and bears upon a spring support 255 to urge the takeup sprocket into engagement with drive chain 244.

*Clamp Cam Operation*

It was previously stated that the cam mechanism 132 for reciprocating the clamp bars of magazine clamp mechanism D also operates from the rear drive assembly now being described. There is an actuating cam mechanism 132 at each side of the machine, and each of said mechanisms is supported upon a bracket 256 which surmounts one of the two side plates 20 and 21 as seen in FIG. 11. An inwardly extending pin 257 in each bracket 256 supports a lever 258 which consists of a hub 259 carried on pin 257, a pair of spaced plates 260 on the hub, a contact roller 261 journalled on a pin 262 between plates 260, and a pivot 263 for an adjustable tie bar 264. The tie bar connects lever 258 to a similar lever 265 which is rockably supported on a pin 266 in the intermediate brackets 93a, which also supports an end of adjusting screw shaft 93, as previously described. Lever 265 also carries a bearing roller 267, which, together with bearing roller 261, are in contact with the top surface of one of the actuating beams 131 of clamp mechanism D. Thus, levers 258 and 265 tilt about their respective axes 257 and 266 in a parallel manner, so as to move actuating beam 131 of clamp mechanism D up and down against the tension of the compression springs 123 and 124 in the supporting post assemblies 119. Rocking movement of the levers 258 and 265 at the two sides of the clamp mechanism is produced by a pair of eccentrics 268 on cam shaft 235, each of which is surrounded by an annular cam follower 269 having an actuating arm 270 pivotally connected to the adjacent lever 258 at 271.

Forwarding Rollers

Cooperating with carrier assembly G to forward magazines from the front trimming blade to the end trimming blades is the forwarding roller assembly, heretofore indicated generally at 73. This assembly consists of a drive sprocket 272 keyed to shaft 241 upon which idler sprockets 240 for carrier chains 242 are also journalled. A drive chain 273 connects a sprocket 274 on power distributing shaft 67 with drive sprocket 272 on shaft 241 so as to rotate said shaft, which also carries a pair of spaced roller segments 275 flanking carrier chain 242. Cooperating with roller segment 275 are idling friction rollers 276 which are journalled on a cross shaft 277 supported in bearing blocks 278 which are vertically slidable between upstanding arms 93b and 93c of intermediate brackets 93a. Shaft 277 is drawn down by a pair of tension springs 279 which hold bearing blocks 278 in the bottoms of the cradles formed by arms 93b and 93c, and which retain idler rollers 276 substantially in contact with roller segments 275, so as to hold a magazine firmly against the roller segment when the latter is uppermost as seen in FIG. 7. Roller segments 275 are to timed with respect to reciprocation of table assembly B and the travel of carrier chain lugs 242a, and with the clamping mechanism D and stop mechanism E, that the table movement carries a magazine which has just been trimmed by the front blade assembly into the nip of roller segments 275 and idler rollers 276 very shortly after the magazine has been released by the clamping mechanism D and stop mechanism E, and just as a pair of pusher lugs 242a on the carrier chains 242 move into approximately the position illustrated in FIG. 7 of the drawings, where they may pick up the magazine and carry it forward while table B returns toward the infeed.

Rear Pusher Assembly

Cooperating with carrier chain assembly G and forwarding roller assembly 73 to position magazines against rear stop lugs 141 of stop mechanism E is a pair of pusher assemblies, each indicated at 280, which are seen in FIGS. 4 and 5 to be associated with longitudinal clamp arms 126. Each pusher assembly 280 includes a fixed cam 281 which is mounted upon end cutter assembly 59. Mounted upon the inner face of each longitudinal clamp bar 126 is a bracket 282 having a stud 283 for the bearing boss 285 of a pusher lever, indicated generally at 286. Lever 286 includes a cam follower arm 287 which has an outwardly extending pin 288 for a cam follower roller 289 which bears upon an upright cam surface 281a of fixed cam 281, and a depending pusher arm 290 at the lower end of which is an inwardly extending pin 291 for a pusher finger 292. A leaf spring 293 is riveted to arm 290 and bears upon pusher finger 292.

Cam follower roller 289 is urged into contact with cam face 281a by a cam follower spring 294 which is secured at one end to a hook 295 on pusher arm 290, and at the other end to a stud 296 on clamp bar 126. Adjustment of pusher lever 286 with respect to cam face 281a is accomplished by means of a first adjusting screw 297 which is carried on lever 290, and a second adjusting screw 298 which is carried on a bracket 299 on clamp bar 126.

The construction and arrangement of pusher assembly 280 is such that as clamp bars 126 are moving down to clamp a magazine at the end trimming position, movement of cam follower roller 289 over cam face 281a causes pusher lever 286 to rotate counterclockwise as seen in FIG. 4, and thus push a magazine against rear stop lugs 141. Immediately the magazine is clamped for trimming by clamping bars 126.

Side Joggers

Also cooperating with the other elements to position a magazine properly for trimming by the end trimming blades is a pair of side jogger assemblies, seen in FIGS. 19 and 20, each indicated generally by reference numeral 300. The purpose of the side jogger assemblies is to assure that each magazine is properly positioned laterally of the reciprocating table B before it is clamped and trimmed by the end trimming blades. Each jogger assembly 300 includes a bracket 301 which is mounted upon one or the other of the side beams 56 or 57 of the trimming blade frame, and a bar cam 302 is secured to bracket 301 in an upright position with a point of maximum width 302a adjacent the beam, an inclined face 302b which merges into a face 302c at which the bar cam is narrowest, and a lower portion 302d of somewhat greater thickness which tapers very gradually into face 302c.

Secured to each of the reciprocating table side beams 34 and 35 is a jogger bearing block 303, and slidably mounted in the bearing block is an assembly including a slide block 304 and a jogger arm 305 which is longitudinally slotted at 305a so that the arm may be adjusted on the slide block to properly position its jogger plate 306 with respect to the end trimming blades 106. Slide block 304 has a laterally extending spring and guide arm 307 from which a spring guide rod 308 extends through a guide boss 309 which projects laterally from bearing block 303. A compression spring 310 coiled around rod 308 between boss 309 and arm 307 urges the bearing slide block 304, jogger arm 305 and jogger plate 306 inwardly toward end trimming blade 106. A cam follower roller 311 is rotatably mounted upon a stud 311a at the outer end of jogger arm 305, and bears against the cam surface of fixed cam 302.

It may be seen from the shape of the cam face that when the trimming blade frame is at bottom dead center position, the jogger cam follower roller 310 bears upon the cam surface 302a at the widest part of the cam, which retracts jogger arm 305. As the trimming blade frame rises while the table is moving toward carrier chain assembly G the inclined cam surface 302b traverses the cam follower roller and permits the jogger arm to move toward its most inward position, which is reached when the roller reaches the narrowest part 302c of the cam. As rotation of the supporting cranks for the trimming blade frame continues to raise the cam 302 the follower roller 310 moves into the thicker portion 302d at the extreme lower end of the cam, thus slightly retracting the jogger arm. Then as the trimming blade frame again moves down to execute the next trimming stroke, movement of the gradually tapered face connecting cam faces 302d and 302c over the cam follower roller 310 permits jogger arm 305 to move slowly inwardly under the urging of compression spring 310, and jogger plate 306 softly pushes a magazine into the desired precise lateral position on table B just before the magazine is clamped by clamp bars 128. A quick jog must be avoided, as it usually rumples the magazine cover.

Carrier Chain Adjustment

Adjustment of the space between carrier chains 242 and between the end trimming blades 106 is accomplished by an adjusting mechanism indicated generally at 312 (see FIGS. 6 and 7).

Journalled in intermediate brackets 93a are coaxial, threaded front adjusting screws 93, the inner end of each which provides an adjusting screw for the front of one of the main longitudinal beams 92, and journalled in rear plates 27 and 28 are similar rear adjusting screws 94 for the rear of said beams. The outer end 94a of each screw shaft 94 is square (FIG. 6), to accept a socket wrench for rotating the shaft, and on each end of the shaft is a sprocket 313 from which an adjusting chain 314 extends downwardly at the outside of the adjacent base side plate, and is wrapped around a sprocket 315 keyed to a shaft 316 which extends through the side plate and has a second sprocket 317 at its inner end. A chain 318 wrapped around sprocket 317 extends forwardly along the inside of the side plate, and one of its runs extends around a sprocket 319 on a stub shaft 320 in the base, while the other run of chain 318 traverses an adjusting sprocket 321 and thence the chain extends up to wrap around a sprocket 322 front adjusting screw 93. Thus rotation of shaft 94 by using an Allen wrench is transmitted through chains 314 and 318 with their associated sprockets to shaft 93.

Adjacent each trimming blade assembly the magazine trimmer has a clippings duct which is connected to a vacuum system for the removal of the trimmings from the operation of the machine. Thus, as seen in FIGS. 2 and 9, reciprocating table B has a front clippings hopper 323 one end of which communicates with a longitudinal duct 324, and trimmings are dropped down and through a cross vent 325. Similarly, each of the end trimming blades is provided with an associated trimmings hopper 326 (see FIG. 10) from which trimmings are withdrawn for disposal.

*Machine Cycle*

An understanding of machine operation is facilitated by reference to FIG. 21 of the drawings, which illustrates the timing of the various components with reference to the rotation of the cranks 44 and 45 which reciprocate table B and provide the rotary motion for blade assembly C.

In FIG. 21 bottom dead center in the operation of the machine is shown as zero degrees, and the rotary motion of the cranks is shown by the angles which are laid out counterclockwise from the bottom dead center point, to coincide with the movement of the cranks.

As previously stated, in all the drawings except FIGS. 13–15 the components of the machine are shown at bottom dead center, at which point FIG. 21 shows that the cut of the books has been completed by the trimming blade assemblies, while stop bar 137 is in process of retracting and clamp frame 118 is moving up to release the magazines, or books which have just been trimmed. Consideration of the drive mechanism for blade assembly C and reciprocating table B will make it apparent that the blade assembly is just beginning to move up, while the reciprocating table is at its point of most rapid motion away from the infeed. By the 30° point of the circle the stop bar 137 is fully lowered and the clamp frame 118 is completely released; so that when the forwarding roller segments 275 rotate into contact with the magazine, or book, at the front trimming blade at 47° of the circle, the magazine is free to be transferred by the segments 275 to the carrier chain 242. At 90° of the circle, of course, table B reverses its travel; but the book or magazine continues to be moved by the forwarding rollers until, at 175° 15 minutes of the circle, just before top dead center of the cranks, the book leaves the rollers and is transported by carrier chain 242 toward the pushers 289 which move it into position for operation of the end trimming blades.

At 230° of the circle, stop bar 137, carrying stop lugs 140 and 141, starts to move up, while at about 245° the clamp frame 118 begins its downward motion to clamp the magazines.

As shown by the legends in the area at about 270° of the circle, the machine is designed to trim magazines having a maximum thickness of 7/16", and on such a magazine the clamp frame 118 will produce a maximum compression of 1/8". The machine will handle any magazine from the maximum down to theoretical minimum of one page.

At 285° of the circle, which is shortly after the table has started to move away from the infeed, stop bar 137 is fully up, and the feed pushers 199 and 280 are moving up and in to hold the magazines against both sets of stops. From about 295° to 305° the pushers are holding the magazines against the stops, and during that time the velocity of the pushers and the stops is approximately the same. At 305° the clamping frame 118 clamps the books, and at 310° the pushers 199 and 280 begin to retract and lower.

While all the above described components have been carrying on their functions, the blade assembly C has been moving down from its top dead center position, and at 316° of the circle the front and end trimming blades start their cut on magazines of maximum thickness. Of course, if the magazines are thinner the cut will start at a later point in the circle.

At 330° the magazine stop bar 137 begins to lower, so as to clear the magazines for their travel; and shortly after that the clamp frame begins to release at about 335°. It is clear that by this time the blade assembly C has practically stopped its downward travel, and the actual shearing of the magazines by the blades is complete.

The foregoing detailed description is given for clearness of understanding only and no unnecesary limitations are to be understood therefrom, as some modifications will be obvious to those skilled in the art.

We claim:

1. In a magazine trimmer, in combination: a base; magazine handling means including a lugged infeed chain, a lugged carrier chain, and a reciprocating table moving toward and away from the infeed chain, said chains and table cooperating to move magazines across the base substantially continuously but at varying speeds, and in precise alignment and evenly spaced relationship; a blade carrier frame spanning the table; a first movable blade support on the frame adjacent the infeed chain and extending transversely of the handling means; a front margin trimming blade on said first support; a second movable blade support on the frame above the carrier chain; a pair of end margin trimming blades on said second support parallel to the handling means; crank means for moving said carrier frame in a translatory closed path which is perpendicular to the plane of the table; scotch yoke means cooperating with said crank means to reciprocate the table so that the movement of said blades relative to said table is a reciprocation in a vertical plane; cam means to reciprocate the blade supports for endwise movement of the blades as they trim the magazines; and retractable means for anchoring each magazine while it is trimmed.

2. The combination of claim 1 in which the retractable means includes a stop lug on the reciprocating table adjacent each blade against which the magazines abut, means for simultaneously retracting the lugs immediately after the magazines are trimmed, a clamp on the reciprocating table adjacent each lug, and actuating means for causing said clamps to clamp magzines on the table in abutment with the lugs.

3. The combination of claim 2 in which the lugged infeed chain moves a magazine onto the table when the chain and table are moving in the same direction and at substantially the same speed, and a reciprocating pusher is associated with the chain to move the magazine away from the chain lugs and against the stop lug which is adjacent the front trimming blade.

4. The combination of claim 3 in which the lugged carrier chain contacts a magazine on the table as the table is completing its reciprocating movement away from the infeed chain and when the carrier chain and table are moving at substantially the same speed, and moves the magazine forward as the table reciprocates toward the infeed chain.

5. In a magazine trimmer, in combination: a base; magazine handling means including a reciprocating table and cooperating conveyors for advancing spaced magazines uninterruptedly across said base in one direction; trimming blade means above the table and mounted on the base separate from the table; crank means for driving said trimming blade means continuously in a translatory closed path; and scotch yoke means for constantly reciprocating said table from said crank means in such a way that movement of the blade means relative to the table is a straight reciprocation in a vertical plane.

6. In a magazine trimmer, in combination: a base; magazine handling means including a plurality of cooperating elements for moving magazines continuously along said base in evenly spaced relationship; a pair of parallel shafts in said based disposed transversely to the conveyor means; cranks on both ends of said shafts; supporting arms pivoted on the ends of said cranks; guide means maintaining said arms in a vertical position; a blade carriage surmounting said arms so as to execute translatory motion in a circular path as the shafts are rotated, said carriage spanning an element of the handling means on which magazines are supported for trimming; a front trimming blade on said carriage transverse to the base; a pair of parallel end trimming blades on the frame and extending longitudinally of the base; and means including said guide means coordinating movement of said element of the handling means with movement of the carriage so that rotation of the cranks moves the blades in and out of trimming engagement with each magazine only when the blades are moving perpendicular to said element of the handling means.

7. The combination of claim 6 in which the magazine handling means includes a table, and the guide means provides a scotch yoke which interconnects said cranks and said table to reciprocate the table in conjunction with rotation of the carrier frame whereby the movement of the blades relative to the table is reciprocation in a vertical plane.

8. The combination of claim 7 in which the conveyor means includes a driven lugged infeed chain feeding magazines toward said table, and a reciprocating pusher is associated with said infeed chain to push magazines away from the infeed chain lugs as they move onto the table.

9. The combination of claim 8 in which the table has a longitudinal slot, the conveyor means includes a lugged carrier chain running in said slot, and means driving said carrier chain to move a magazine forward as the table reciprocates toward the infeed chain.

10. In a magazine trimmer, in combination: a base; magazine handling means including conveyor means for moving magazines substantially continuously across said base in precise alignment and in evenly spaced relationship; means for driving said magazine handling means including cross shaft means provided with crank means; a plurality of trimming blades operatively associated with said handling means and positioned to trim the front margin and end margins of magazines in the handling means; and blade drive means including said crank means for imparting to said trimming blades a continuous motion that includes a first component in the direction of movement of the magazines and a second component normal thereto, said first component causing the blades to move during a trimming stroke at the same speed as the magazines are then moving.

11. The magazine trimmer of claim 10 in which the cross shaft means comprises a pair of parallel shafts, the cranks are on the ends of said shafts, and which includes supporting arms pivoted on said cranks, guide means maintaining said arms in a vertical position, a trimming blade support frame carried on said arms, and in which the magazine handling means includes a table beneath said blade support frame, said table being operatively connected to said guide means so as to be reciprocated by the movement of the arms.

12. The magazine trimmer of claim 11 in which the guide means is mounted on the sides of the table, and cooperates with the arms to provide scotch yoke means.

13. In a magazine trimmer, in combination: a base; continuously operating magazine transfer means including a lugged infeed conveyor chain, an intermediate transfer element receiving magazines from the chain, and a final transfer element, said elements being driven in timed relationship with said chain and cooperating to move magazines from element to element and uninterruptedly across said base; handling means associated with said transfer means to retain said magazines in precise alignment and in evenly spaced relationship as the magazines are moved across the base; a plurality of trimming blades overlying said intermediate transfer element for trimming the front margin and end margins of magazines in the transfer means; and continuously operating blade drive means coordinated with said transfer and said handling means to move the blades uninterruptedly into and out of trimming engagement with magazines on said intermediate transfer element when the blades and magazines are moving in the same direction and at the same speed.

14. The magazine trimmer of claim 13 in which the intermediate transfer element is a reciprocating table on which the magazines are supported during trimming, and in which the final transfer element is conveyor means for moving magazines forward on the base during the reverse movement of the table.

15. In a magazine trimmer, in combination: a base; continuously operating magazine handling means including a driven lugged infeed conveyor chain, a reciprocating table driven in timed relationship with the chain so as to receive magazines from the chain as the chain and table are moving in the same direction and at substantially the same speed, and conveyor means for moving magazines forward on the base during reverse movement of the table; a plurality of trimming blades overlying the table for trimming the front margin and end margins of magazines supported on the table; and continuously operating blade drive means coordinated with said handling means to move the blades uninterruptedly into and out of trimming engagement with magazines on said table when the blades and magazines are moving in the same direction and at the same speed.

16. The combination of claim 15 in which there is a retractable stop lug on the table just ahead of each magazine leaving the infeed chain, and in which pusher means is operated in timed relationship with the infeed chain and the table to push the magazine away from a lug on the infeed chain and against the stop lug before the trimming blades contact the magazine.

References Cited in the file of this patent

UNITED STATES PATENTS

| | | |
|---|---|---|
| 1,132,626 | Seybold | Mar. 23, 1915 |
| 1,556,581 | Booth | Oct. 13, 1925 |
| 2,366,237 | Clausen | Jan. 2, 1945 |
| 2,375,717 | Winkel | May 8, 1945 |
| 2,414,906 | Seltzer | Jan. 28, 1947 |
| 2,482,635 | Moyer | Sept. 20, 1949 |
| 2,857,966 | Sarka | Oct. 28, 1958 |
| 2,944,456 | Christiansen | July 12, 1960 |